US012560694B2

(12) United States Patent
Dai et al.

(10) Patent No.: US 12,560,694 B2
(45) Date of Patent: Feb. 24, 2026

(54) FIRST AND SECOND ORDER REFLECTION-ASSISTED SENSING

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/066,990

(22) Filed: Dec. 15, 2022

(65) Prior Publication Data

US 2024/0201356 A1    Jun. 20, 2024

(51) Int. Cl.
G01S 13/06 (2006.01)

(52) U.S. Cl.
CPC .................................... G01S 13/06 (2013.01)

(58) Field of Classification Search
CPC ........ G01S 13/003; G01S 13/06; G01S 13/48; G01S 2013/462; G01S 7/006
See application file for complete search history.

(56) References Cited

U.S. PATENT DOCUMENTS

2022/0247480 A1* 8/2022 Papadopoulos ....... G01S 5/0273
2023/0333242 A1* 10/2023 Tadayon ............. H04L 27/0006

2024/0027574 A1* 1/2024 Zhuang ................... G01S 13/87
2024/0337722 A1* 10/2024 Shrivastava .......... G01S 5/0289
2024/0337723 A1* 10/2024 Li ........................... G01S 7/006

FOREIGN PATENT DOCUMENTS

WO         2022164596 A1    8/2022

OTHER PUBLICATIONS

International Search Report and Written Opinion—PCT/US2023/082110—ISA/EPO—Mar. 13, 2024.
Lu W., et al., "Intelligent Reflecting Surface Deployment in Cooperative Radar Communication System", 2021 IEEE/CIC International Conference on Communications in China (ICCC Workshops), IEEE, Jul. 28, 2021, pp. 48-53, XP033976776, Sections I, II, Abstract, Figure 1.

(Continued)

*Primary Examiner* — Timothy X Pham
(74) *Attorney, Agent, or Firm* — Procopio, Cory, Hargreaves & Savitch LLP

(57) ABSTRACT
A first wireless device may output a sensing signal configuration for performing sensing on a first reflected sensing signal from the first wireless device via a target object and a second reflected sensing signal from a reflective object via the target object based on a set of sensing signals. The first wireless device may transmit the set of sensing signals to the target object and the reflective object. The reflective object may reflect at least one of the set of sensing signals to the target object based on the sensing signal configuration. The first reflected sensing signal and the second reflected sensing signal may be received by the first wireless device in a monostatic configuration or by a second wireless device in a bi-static configuration. The receiving device may calculate a location of the target object based on the sensing signal configuration.

30 Claims, 18 Drawing Sheets

(56)          References Cited

OTHER PUBLICATIONS

Wei T., et al., "IRS-Aided Wideband Dual-Function Radar-Communications with Quantized Phase-Shifts", 2022 IEEE 12th Sensor Array and Multichannel Signal Processing Workshop (SAM), IEEE, Jun. 20, 2022, pp. 465-469, XP034153610, The Whole Document.

Yan S., et al., "A Reconfigurable Intelligent Surface Aided Dual-Function Radar and Communication System", 2022 2nd IEEE International Symposium on Joint Communications & Sensing (JC&S), IEEE, Mar. 9, 2022, 6 Pages, XP034108834, Figure 1.

Zhang G., et al., "Beampattern Design for RIS-Aided Dual-Functional Radar and Communication Systems", GLOBECOM 2022—2022 IEEE Global Communications Conference, IEEE, Dec. 4, 2022, pp. 3899-3904, XP034269215, Figure 1.

* cited by examiner

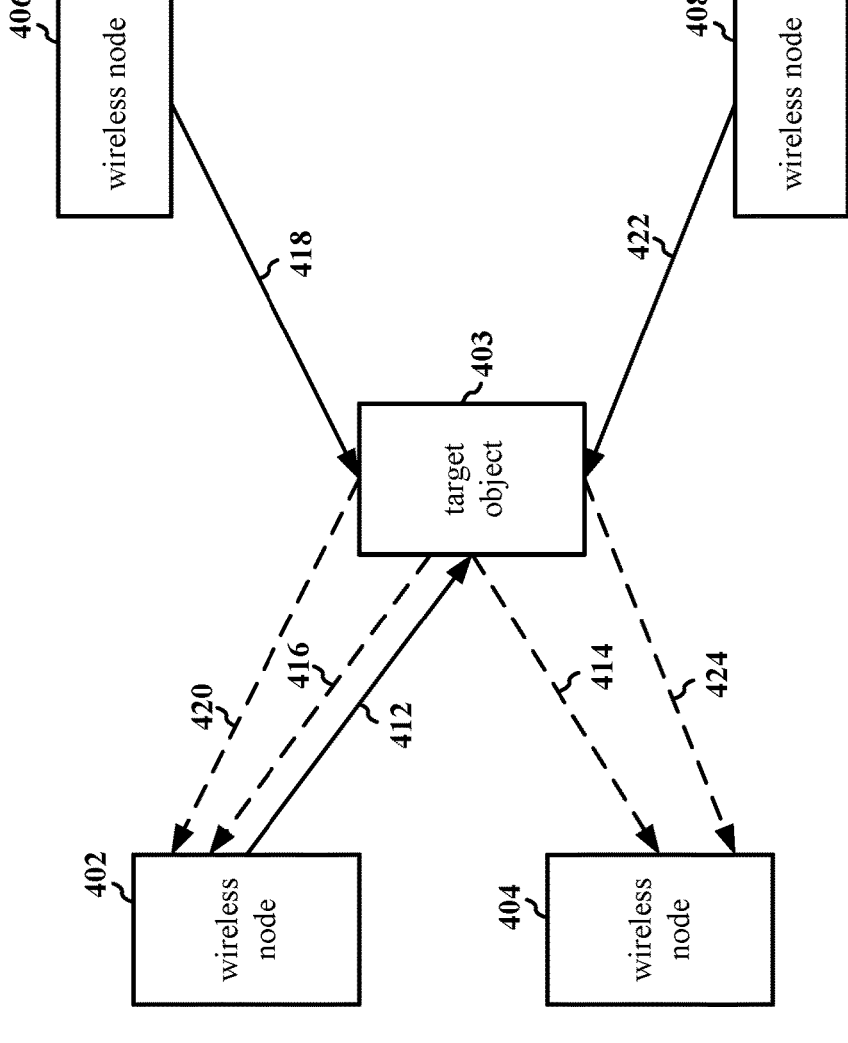
transmitted signal
reflected signal
FIG. 4

705 target
object

704

RIS

702 wireless
node

708 configure sensing signals

712 sensing signal
configuration

714 set of sensing signals

716 set of 1ˢᵗ order reflected
sensing signals

718 set of 2ⁿᵈ order reflected
sensing signals

720 set of sensing signals

722 set of 1ˢᵗ order reflected
sensing signals

724 perform sensing

700 target object
905 reflector
904 wireless node
902 configure sensing signals
908 set of sensing signals
914 set of 1st order reflected sensing signals
916 set of 2nd order reflected sensing signals
918 set of sensing signals
920 set of 1st order reflected sensing signals
922 perform sensing
924

900

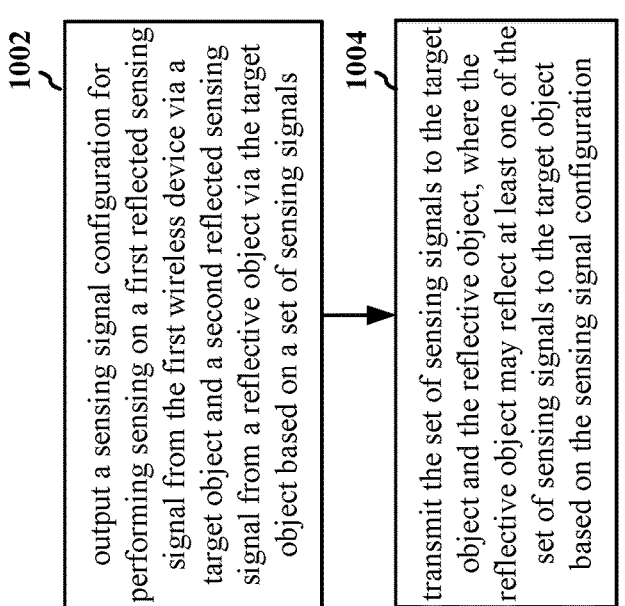

1002 output a sensing signal configuration for performing sensing on a first reflected sensing signal from the first wireless device via a target object and a second reflected sensing signal from a reflective object via the target object based on a set of sensing signals

1004 transmit the set of sensing signals to the target object and the reflective object, where the reflective object may reflect at least one of the set of sensing signals to the target object based on the sensing signal configuration

Figure 11:
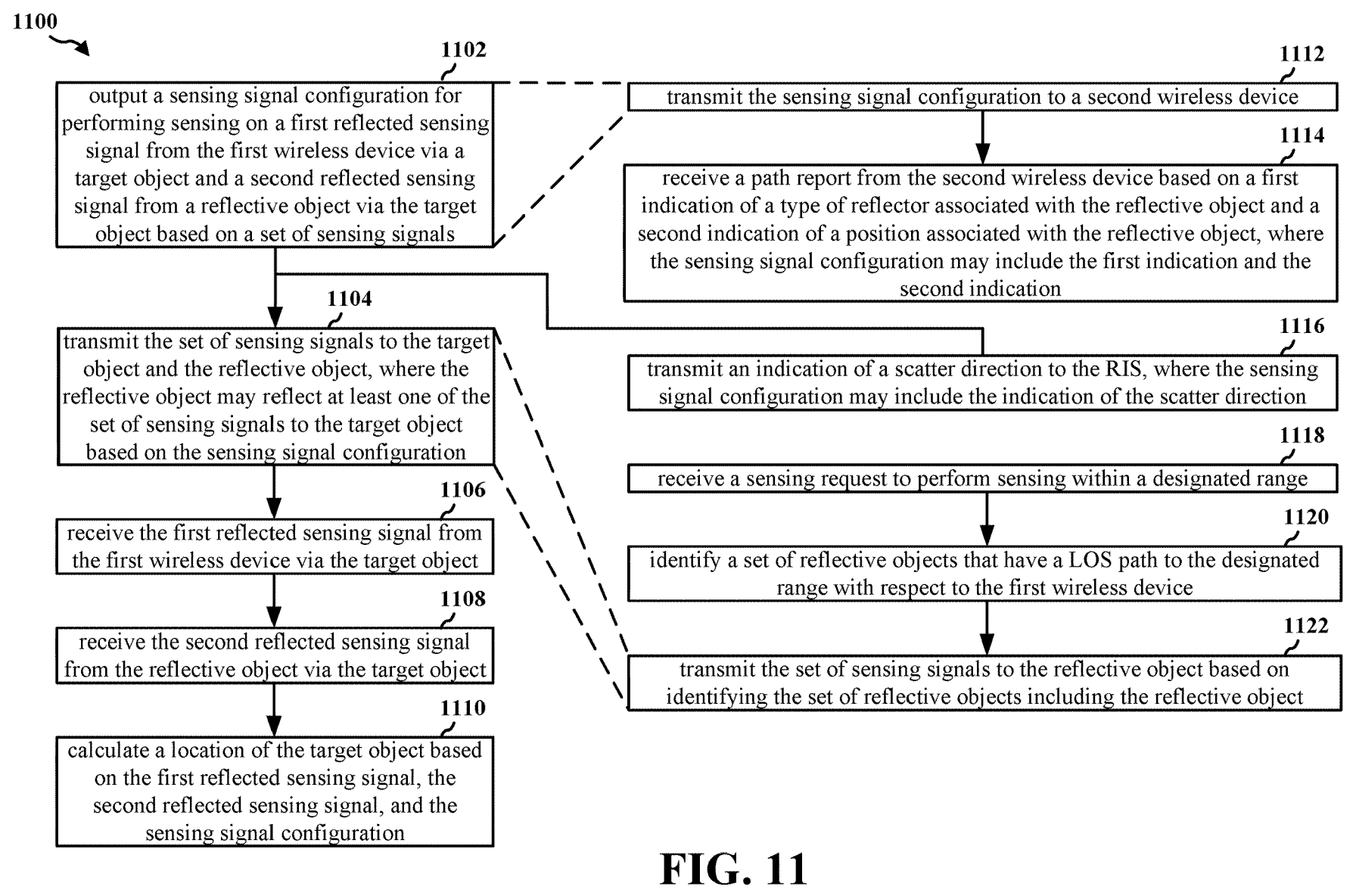

1112 — transmit the sensing signal configuration to a second wireless device

1114 — receive a path report from the second wireless device based on a first indication of a type of reflector associated with the reflective object and a second indication of a position associated with the reflective object, where the sensing signal configuration may include the first indication and the second indication 1116 — transmit an indication of a scatter direction to the RIS, where the sensing signal configuration may include the indication of the scatter direction 1118 — receive a sensing request to perform sensing within a designated range 1120 — identify a set of reflective objects that have a LOS path to the designated range with respect to the first wireless device 1122 — transmit the set of sensing signals to the reflective object based on identifying the set of reflective objects including the reflective object 1102 — output a sensing signal configuration for performing sensing on a first reflected sensing signal from the first wireless device via a target object and a second reflected sensing signal from a reflective object via the target object based on a set of sensing signals 1104 — transmit the set of sensing signals to the target object and the reflective object, where the reflective object may reflect at least one of the set of sensing signals to the target object based on the sensing signal configuration 1106 — receive the first reflected sensing signal from the first wireless device via the target object 1108 — receive the second reflected sensing signal from the reflective object via the target object 1110 — calculate a location of the target object based on the first reflected sensing signal, the second reflected sensing signal, and the sensing signal configuration

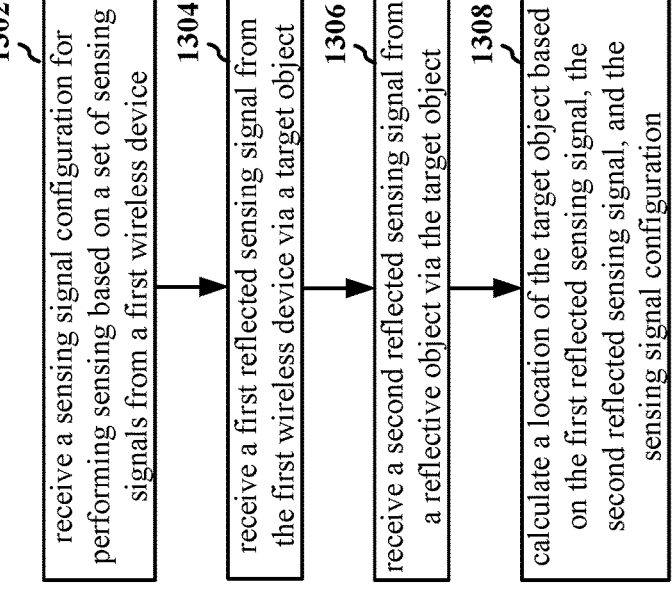

1300

1302 receive a sensing signal configuration for performing sensing based on a set of sensing signals from a first wireless device

1304 receive a first reflected sensing signal from the first wireless device via a target object

1306 receive a second reflected sensing signal from a reflective object via the target object

1308 calculate a location of the target object based on the first reflected sensing signal, the second reflected sensing signal, and the sensing signal configuration

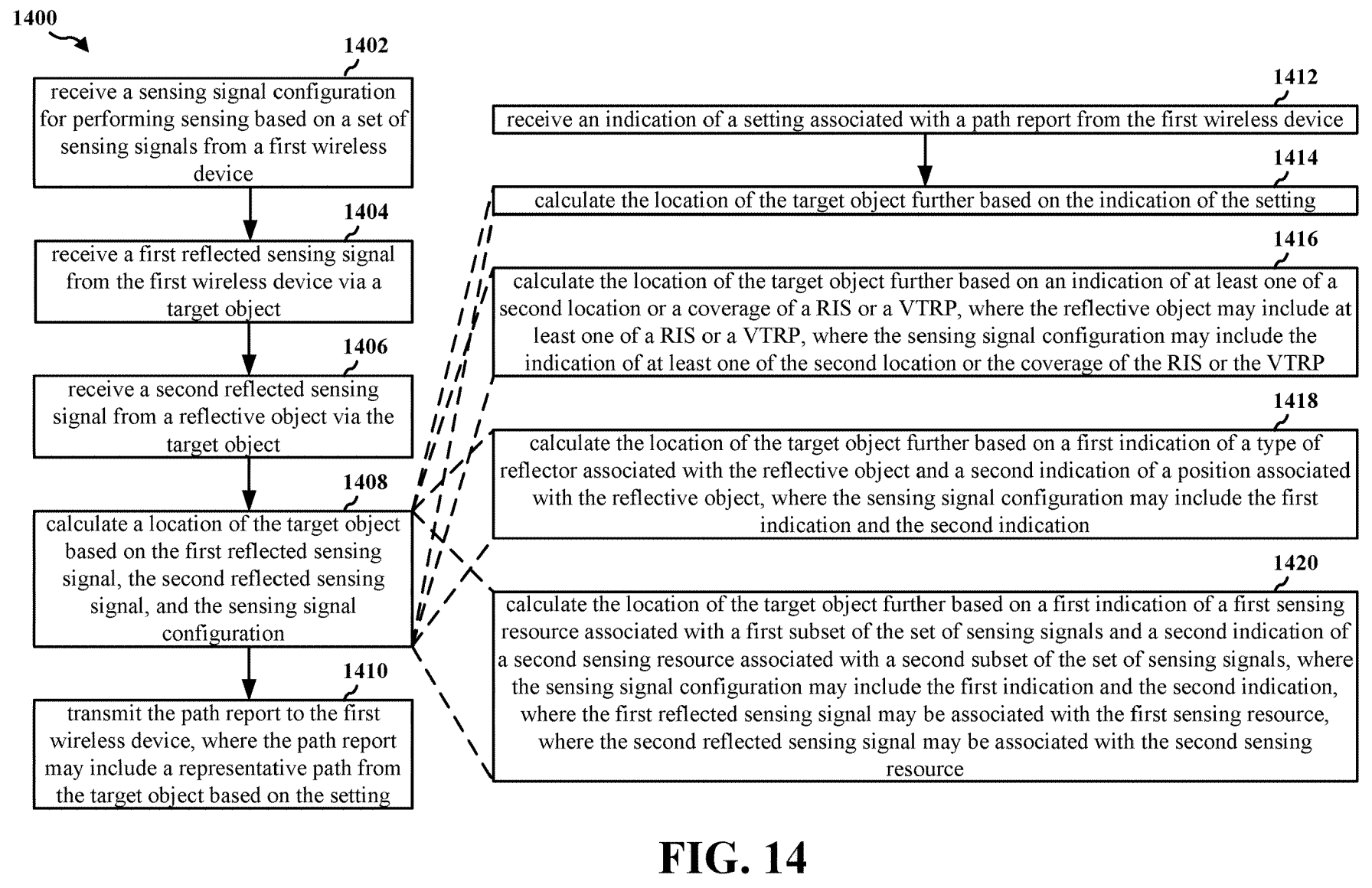

1402 receive a sensing signal configuration for performing sensing based on a set of sensing signals from a first wireless device 1404 receive a first reflected sensing signal from the first wireless device via a target object 1406 receive a second reflected sensing signal from a reflective object via the target object 1408 calculate a location of the target object based on the first reflected sensing signal, the second reflected sensing signal, and the sensing signal configuration 1410 transmit the path report to the first wireless device, where the path report may include a representative path from the target object based on the setting 1412 receive an indication of a setting associated with a path report from the first wireless device 1414 calculate the location of the target object further based on the indication of the setting 1416 calculate the location of the target object further based on an indication of at least one of a second location or a coverage of a RIS or a VTRP, where the reflective object may include at least one of a RIS or a VTRP, where the sensing signal configuration may include the indication of at least one of the second location or the coverage of the RIS or the VTRP 1418 calculate the location of the target object further based on a first indication of a type of reflector associated with the reflective object and a second indication of a position associated with the reflective object, where the sensing signal configuration may include the first indication and the second indication 1420 calculate the location of the target object further based on a first indication of a first sensing resource associated with a first subset of the set of sensing signals and a second indication of a second sensing resource associated with a second subset of the set of sensing signals, where the sensing signal configuration may include the first indication and the second indication, where the first reflected sensing signal may be associated with the first sensing resource, where the second reflected sensing signal may be associated with the second sensing resource

FIG. 14

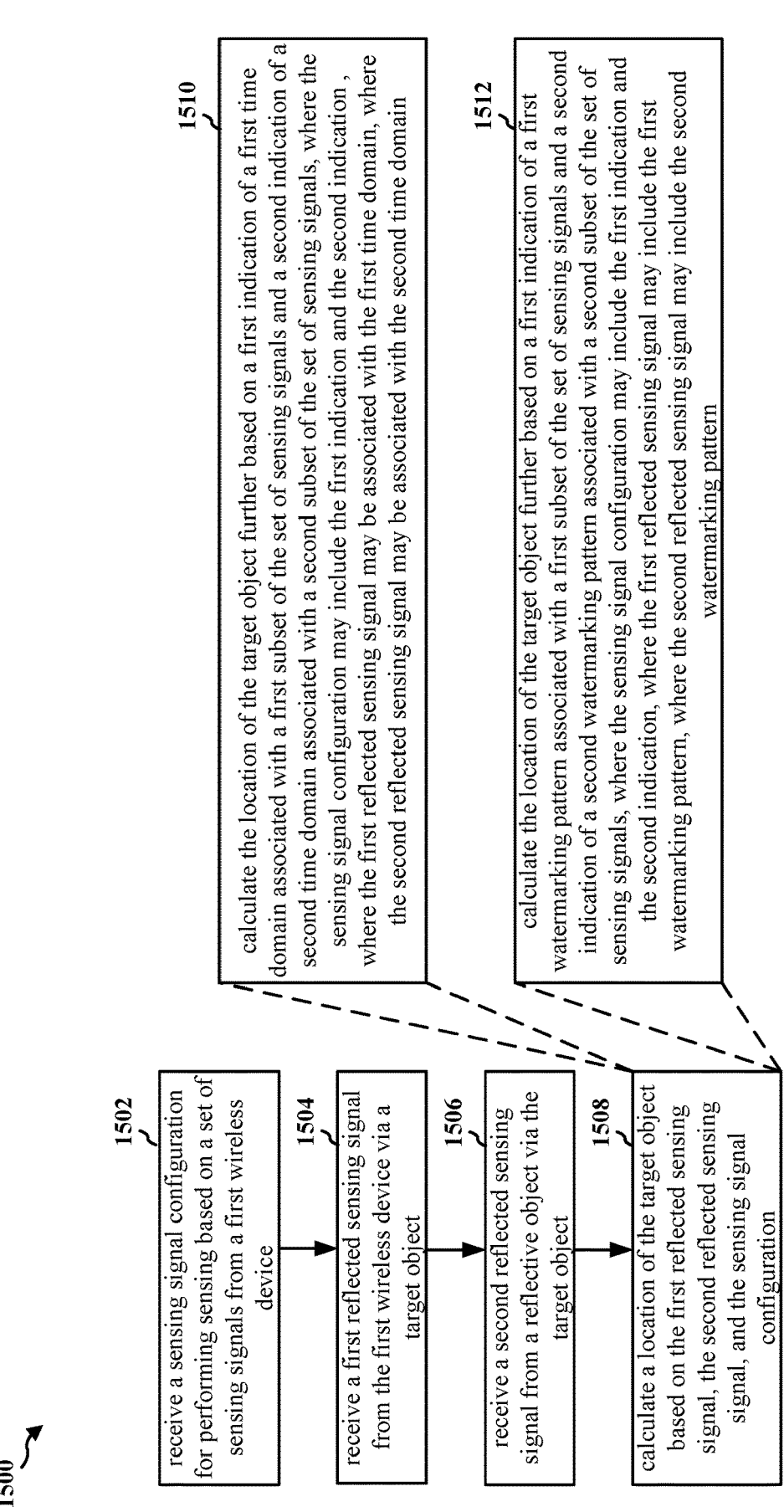

1500

1502 receive a sensing signal configuration for performing sensing based on a set of sensing signals from a first wireless device 1504 receive a first reflected sensing signal from the first wireless device via a target object 1506 receive a second reflected sensing signal from a reflective object via the target object 1508 calculate a location of the target object based on the first reflected sensing signal, the second reflected sensing signal, and the sensing signal configuration 1510 calculate the location of the target object further based on a first indication of a first time domain associated with a first subset of the set of sensing signals and a second indication of a second time domain associated with a second subset of the set of sensing signals, where the sensing signal configuration may include the first indication and the second indication , where the first reflected sensing signal may be associated with the first time domain, where the second reflected sensing signal may be associated with the second time domain 1512 calculate the location of the target object further based on a first indication of a first watermarking pattern associated with a first subset of the set of sensing signals and a second indication of a second watermarking pattern associated with a second subset of the set of sensing signals, where the sensing signal configuration may include the first indication and the second indication, where the first reflected sensing signal may include the first watermarking pattern, where the second reflected sensing signal may include the second watermarking pattern

FIG. 15

FIRST AND SECOND ORDER REFLECTION-ASSISTED SENSING

TECHNICAL FIELD

The present disclosure relates generally to communication systems, and more particularly, to a wireless sensing system using first and second order reflections.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first wireless device. The apparatus may output a sensing signal configuration for performing sensing on a first reflected sensing signal from the first wireless device via a target object and a second reflected sensing signal from a reflective object via the target object based on a set of sensing signals. The apparatus may transmit the set of sensing signals to the target object and the reflective object. The reflective object may reflect at least one of the set of sensing signals to the target object based on the sensing signal configuration. The apparatus may receive the first reflected sensing signal and the second reflected sensing signal in a monostatic configuration. The apparatus may receive the first reflected sensing signal from the first wireless device via the target object. The apparatus may receive the second reflected sensing signal from the reflective object via the target object. The apparatus may calculate a location of the target object based on the first reflected sensing signal, the second reflected sensing signal, and the sensing signal configuration.

In an aspect of the disclosure, a method, a computer-readable medium, and an apparatus are provided. The apparatus may include a second wireless device. The apparatus may receive a sensing signal configuration for performing sensing based on a set of sensing signals from a first wireless device. The apparatus may receive a first reflected sensing signal from the first wireless device via a target object. The apparatus may receive a second reflected sensing signal from a reflective object via the target object. The apparatus may calculate a location of the target object based on the first reflected sensing signal, the second reflected sensing signal, and the sensing signal configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating an example of sensing based on measurements of sensing signals.

FIG. 10 is a flowchart of a method of wireless communication.

FIG. 11 is a flowchart of a method of wireless communication.

FIG. 13 is a flowchart of a method of wireless communication.

FIG. 14 is a flowchart of a method of wireless communication.

FIG. 15 is a flowchart of a method of wireless communication.

DETAILED DESCRIPTION

Figure 1:
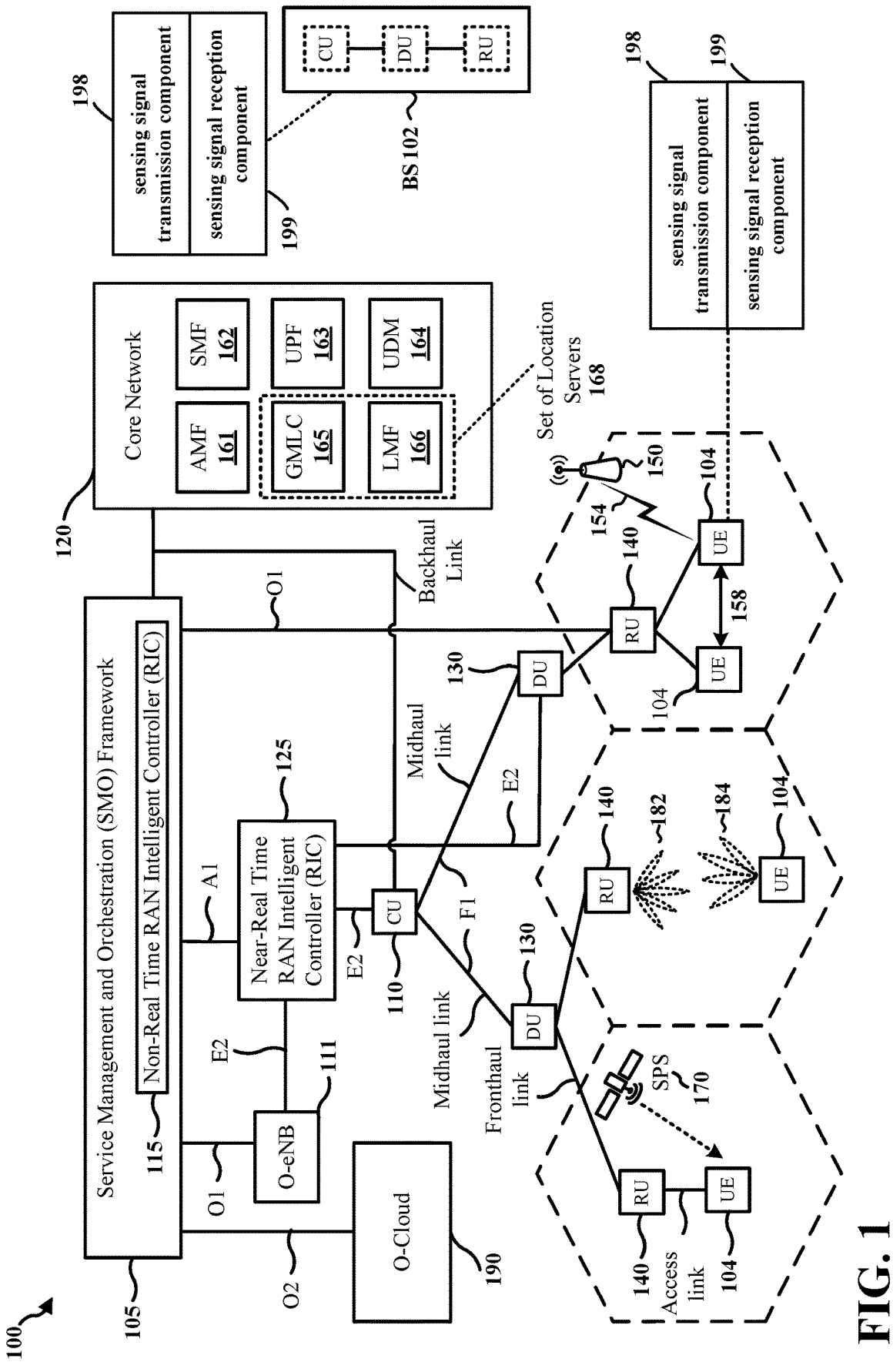
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media may include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a sensing signal transmission component 198 that may be configured to output a sensing signal configuration for performing sensing on a first reflected sensing signal from a first wireless device (e.g., the device with the sensing signal transmission component 198) via a target object and a second reflected sensing signal from a reflective object via the target object based on a set of sensing signals. The sensing signal transmission component 198 may be configured to transmit the set of sensing signals to the target object and the reflective object. The reflective object may reflect at least one of the set of sensing signals to the target object based on the sensing signal configuration. In certain aspects, the UE 104 and/or the base station 102 may have a sensing signal reception component 199 that may be configured to receive a sensing signal configuration for performing sensing based on a set of sensing signals from a second wireless device (e.g., a device with the sensing signal reception component 199). The sensing signal reception component 199 may be configured to receive a first reflected sensing signal from the first wireless device via a target object. The sensing signal reception component 199 may be configured to receive a second reflected sensing signal from a reflective object via the target object. The sensing signal reception component 199 may be configured to calculate a location of the target object based on the first reflected sensing signal, the second reflected sensing signal, and the sensing signal configuration. Although the following description may be focused on sensing signals that reflect off of reconfigurable intelligent surfaces (RISs) or static reflective surfaces that may act as a virtual transmission reception point (VTRP), the concepts described herein may be applicable to any devices that may reflect or otherwise forward sensing signals to a target object. Although the following description may be focused on 5G NR, the concepts described herein may be applicable to other similar areas, such as LTE, LTE-A, CDMA, GSM, and other wireless technologies.

Figures 2A, 2B, 2C, 2D:
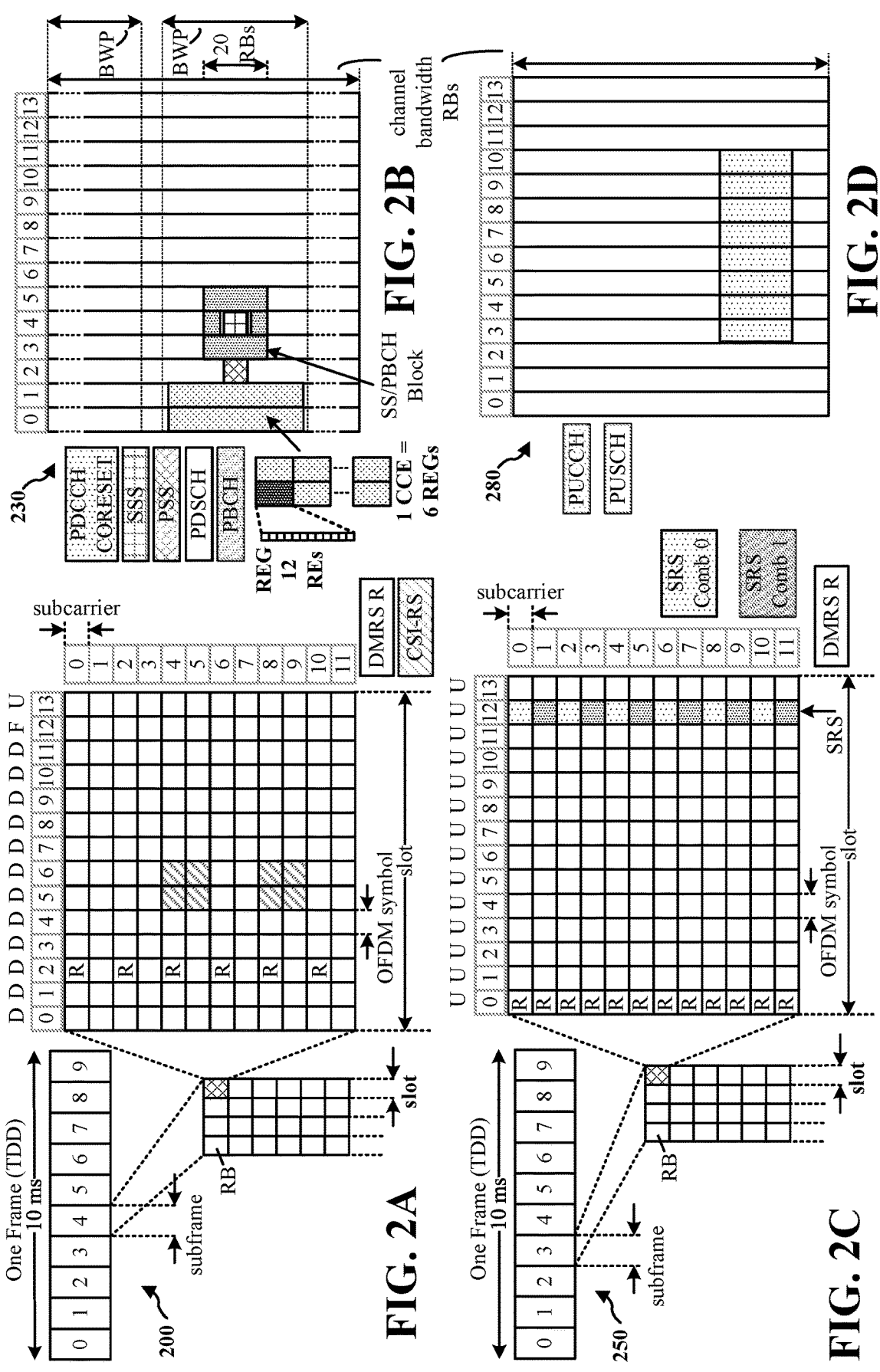
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |

TABLE 1-continued

Numerology, SCS, and CP

| μ | SCS<br>$\Delta f = 2^\mu \cdot 15$[kHz] | Cyclic prefix |
|---|---|---|
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
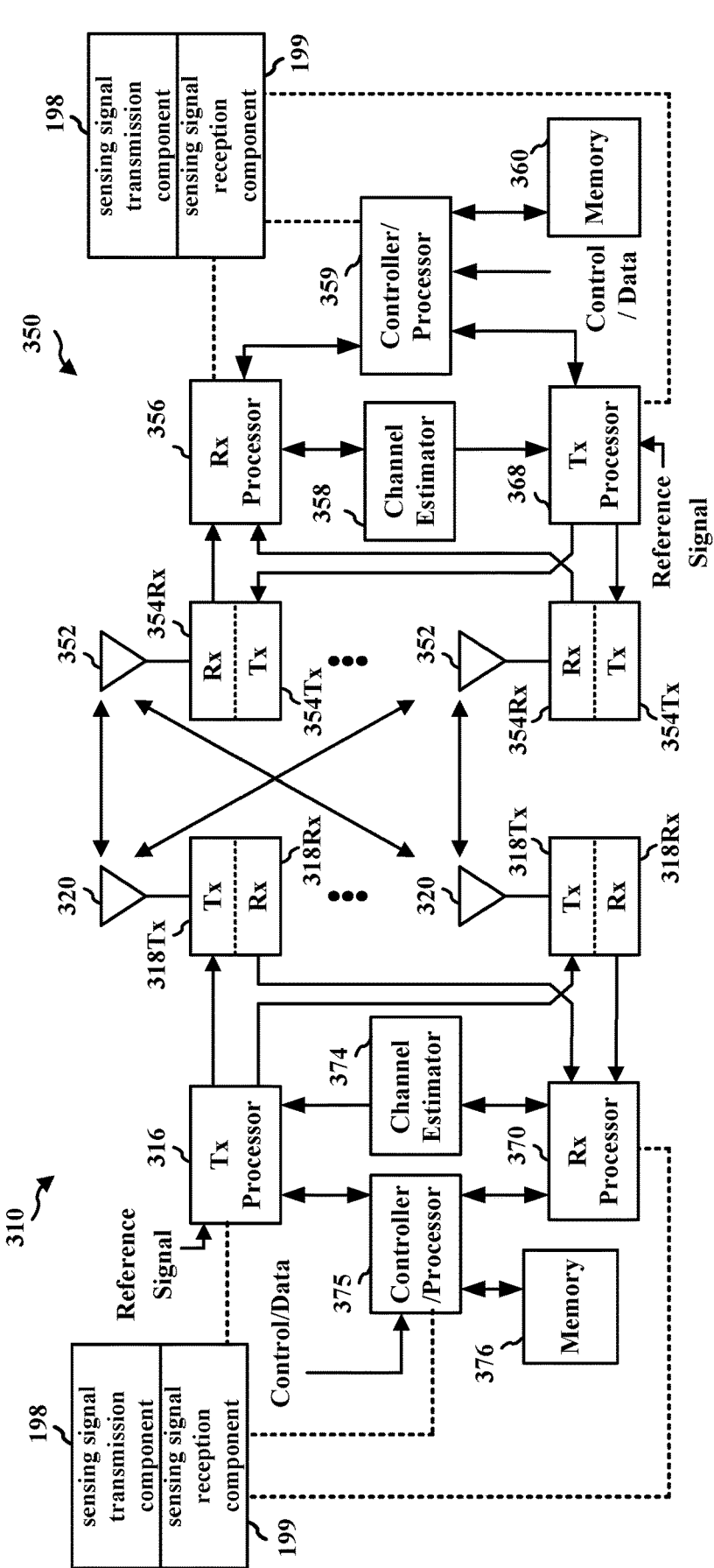
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the sensing signal transmission component 198 of FIG. 1.

At least one of the Tx processor 368, the Rx processor 356, and the controller/processor 359 may be configured to perform aspects in connection with the sensing signal reception component 199 of FIG. 1.

At least one of the Tx processor 316, the Rx processor 370, and the controller/processor 375 may be configured to perform aspects in connection with the sensing signal transmission component 198 of FIG. 1.

At least one of the Tx processor 316, the Rx processor 370, and the controller/processor 375 may be configured to perform aspects in connection with the sensing signal reception component 199 of FIG. 1.

FIG. 4 is a diagram 400 illustrating an example of sensing based on measuring sensing signals transmitted by one or more sensing signals that reflect off of a target object 403. A wireless node that transmits a sensing signal that reflects off of a target object may be referred to as a transmitter node. A wireless node that receives a reflected sensing signal and measures the reflected sensing signal to perform sensing may be referred to as a receiver node. In one aspect, the wireless node 402 may perform monostatic sensing. The wireless node 402 may act as both a transmitter node and a receiver node. The wireless node 402 may transmit a set of sensing signals 412 at the target object 403, the target object 403 may reflect the set of sensing signals 412 as the reflected set of sensing signals 416 at the wireless node 402, and the wireless node 402 may measure the reflected set of sensing signals 416 from the target object 403. In another aspect, the wireless node 402 and the wireless node 404 may perform bistatic sensing. The wireless node 402 may act as a transmitter node and the wireless node 404 acts as a receiver node. The wireless node 402 may transmit a set of sensing signals 412 at the target object 403, the target object 403 may reflect the set of sensing signals 412 as the reflected set of sensing signals 414 at the wireless node 404, and the wireless node 404 may measure the reflected set of sensing signals 414 from the target object 403. In another aspect the wireless node 402 and the wireless node 406 may perform multi-static sensing. The wireless node 402 may act as both a transmitter node and a receiver node, for a first set of sensing signals, and the wireless node 406 acts as a transmitter node while the wireless node 402 acts as a receiver node for a second set of sensing signals. In addition to the wireless node 402 measuring the reflected set of sensing signals 416 from the target object 403 using monostatic sensing, the wireless node 406 may transmit a set of sensing signals 418 at the target object 403, the target object 403 may reflect the set of sensing signals 418 as the reflected set of sensing signals 420 at the wireless node 402, and the wireless node 402 may measure the reflected set of sensing signals 420 from the target object 403. In another aspect the wireless node 402, the wireless node 404, and the wireless node 408 may perform multi-static sensing. The wireless node 402 may act as a transmitter node and the wireless node 404 acts as a receiver node for a first set of sensing signals, and the wireless node 408 acts as a transmitter node and the wireless node 404 acts as a receiver node for a second set of sensing signals. In addition to the wireless node 404 measuring the reflected set of sensing signals 414 from the target object 403 using bistatic sensing, the wireless node 408 may transmit a set of sensing signals 422 at the target object 403, the target object 403 may reflect the set of sensing signals 422 as the reflected set of sensing signals 424 at the wireless node 404, and the wireless node 404 may measure the reflected set of sensing signals 424 from the target object 403. Each wireless node may be any wireless device configured to transmit or receive wireless signals, such as UEs, network nodes, TRPs, or base stations. For example, the wireless node 402 may be a network node configured to transmit the set of sensing signals 412 at the target object 403 and measure the reflected set of sensing signals 416 from the target object 403. In another example, the wireless node 402 may be a network node configured to transmit the set of sensing signals 412 at the target object 403, and the wireless node 404 may be a UE configured to measure the reflected set of sensing signals 414 from the target object 403.

The wireless node 402 may conduct one or more sensing measurements on the reflected set of sensing signals 416 and/or the reflected set of sensing signals 420. In one aspect, the wireless node 402 may calculate a distance or a range between the wireless node 402 and the target object 403 based on a round trip time (RTT) between when the wireless node 402 transmits the set of sensing signals 412 and when the wireless node 402 receives the reflected set of sensing signals 416. In one aspect, the wireless node 402 may calculate a distance or a range that the set of sensing signals 418 and the reflected set of sensing signals 420 travels based on a time between when the wireless node 406 transmits the set of sensing signals 418 and when the wireless node 402 receives the reflected set of sensing signals 420. In one aspect, the wireless node 402 may calculate a location of the target object 403 based on a plurality or range or distance measurements, for example via triangulation using known positions of the wireless nodes 402 and 406 and the calculated range or distance measurements. In one aspect, the wireless node 402 may calculate a velocity of the target object 403 based on a first calculated location of the target object 403 based on the reflected set of sensing signals 416 and/or the reflected set of sensing signals 420 measured at a first time, and a second calculated location of the target object 403 based on the reflected set of sensing signals 416 and/or the reflected set of sensing signals 420 measured at a second time. In one aspect, the wireless node 402 may calculate an AoA of the reflected set of sensing signals 416 and/or an AoD of the set of sensing signals 412 based on a plurality of ports that transmitted the set of sensing signals 412 and a plurality of ports that received the reflected set of sensing signals 416. In one aspect, the wireless node 402 may calculate an AoA of the reflected set of sensing signals 420 and/or an AoD of the set of sensing signals 418 based on a plurality of ports that transmitted the set of sensing signals 418 and a plurality of ports that received the reflected set of sensing signals 420.

Similarly, the wireless node 404 may conduct one or more sensing measurements on the reflected set of sensing signals 414 and/or the reflected set of sensing signals 424. In one aspect, the wireless node 404 may calculate a distance or a range that the set of sensing signals 412 and the reflected set of sensing signals 414 travels based on a time between when the wireless node 402 transmits the set of sensing signals 412 and when the wireless node 404 receives the reflected set of sensing signals 414. In one aspect, the wireless node 404 may calculate a distance or a range that the set of sensing signals 422 and the reflected set of sensing signals 424 travels based on a time between when the wireless node 408 transmits the set of sensing signals 422 and when the wireless node 404 receives the reflected set of sensing signals 424. In one aspect, the wireless node 404 may calculate a location of the target object 403 based on a plurality or range or distance measurements, for example via triangulation using the known positions of wireless nodes 402, 404, and 408, and the calculated range or distance measurements. In one aspect, the wireless node 404 may calculate a velocity of the target object 403 based on a first calculated location of the target object 403 based on the reflected set of sensing signals 414 and/or the reflected set of sensing signals 424 measured at a first time, and a second calculated location of the target object 403 based on the reflected set of sensing signals 414 and/or the reflected set of sensing signals 424 measured at a second time. In one aspect, the wireless node 404 may calculate an AoA of the reflected set of sensing signals 414 and/or an AoD of the set of sensing signals 412 based on a plurality of ports that transmitted the set of sensing signals 412 and a plurality of ports that received the reflected set of sensing signals 414. In one aspect, the wireless node 404 may calculate an AoA of the reflected set of sensing signals 424 and/or an AoD of the set of sensing signals 422 based on a plurality of ports that transmitted the set of sensing signals 422 and a plurality of ports that received the reflected set of sensing signals 424.

While a wireless node may sense parameters of the target object 403 by measuring a reflected set of sensing signals originating from a transmitter node, such a wireless node may improve its sensing by measuring two or more reflected sets of sensing signals originating from two or more transmitter nodes. For example, the wireless node 402 may improve its sensing by measuring the reflected set of sensing signals 416 originating from the wireless node 402 as the set of sensing signals 412 in addition to measuring the reflected set of sensing signals 420 originating from the wireless node 406 as the set of sensing signals 418. In another example, the wireless node 404 may improve its sensing by measuring the reflected set of sensing signals 414 originating from the wireless node 402 as the set of sensing signals 412 in addition to measuring the reflected set of sensing signals 424 originating from the wireless node 408 as the set of sensing signals 422.

While sensing may be improved when a receiver node measures two or more reflected sets of sensing signals originating from two or more transmitter nodes, in some aspects, a wireless network may not have multiple devices located in different locations that may be used as transmitter nodes for a target object, or for a region within which a target object is located. For example, a wireless network may have one transmitter node configured to transmit sets of sensing signals at a target object, or may have multiple transmitter nodes, but one transmitter node may be configured to transmit sets of sensing signals strong enough to be used to perform sensing on a target object in a certain area. In some aspects, a transmitter node may transmit a set of sensing signals at a target object from a plurality of directions by using one or more reflective objects, such as a reconfigurable intelligent surface (RIS) or a static reflection device (e.g., the side of a building made of a material that stably reflects RF signals) which may act as a virtual transmission reception point (VTRP) for the transmitter node.

In some aspects, a first wireless device may output a sensing signal configuration for performing sensing on a first reflected sensing signal from the first wireless device via a target object and a second reflected sensing signal from a reflective object via the target object based on a set of sensing signals. The first wireless device may transmit the set of sensing signals to the target object and the reflective object. The reflective object may reflect at least one of the set of sensing signals to the target object based on the sensing signal configuration. The first reflected sensing signal and the second reflected sensing signal may be received by the first wireless device in a monostatic configuration. In the monostatic configuration, the first wireless device may receive the first reflected sensing signal from the first wireless device via the target object. The first wireless device may receive the second reflected sensing signal from the reflective object via the target object. The wireless device may calculate a location of the target object based on the first reflected sensing signal, the second reflected sensing signal, and the sensing signal configuration. The first reflected sensing signal and the second reflected sensing signal may be received by a second wireless device in a bi-static configuration. The second wireless device may receive a sensing signal configuration for performing sensing based on a set of sensing signals from a first wireless device. The second wireless device may receive a first reflected sensing signal from the first wireless device via a target object. The second wireless device may receive a second reflected sensing signal from a reflective object via the target object. The second wireless device may calculate a location of the target object based on the first reflected sensing signal, the second reflected sensing signal, and the sensing signal configuration.

Figures 5A, 5B:
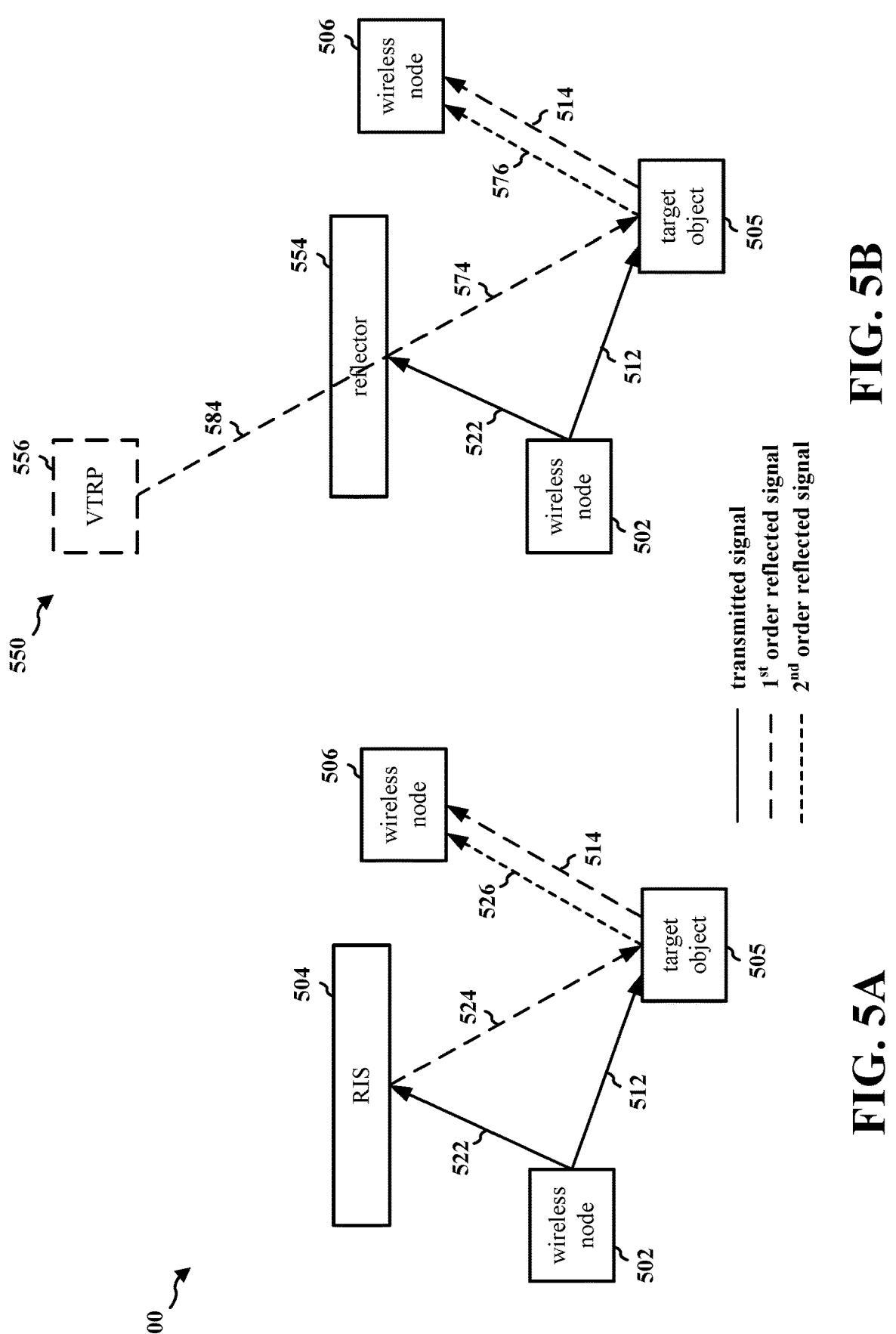
FIG. 5A is a diagram illustrating an example of sensing based on measurements of both first order and second order reflected sensing signals using a reconfigurable intelligent surface (RIS).
FIG. 5B is a diagram illustrating an example of sensing based on measurements of both first order and second order reflected sensing signals using a virtual transmission reception point (VTRP).

FIG. 5A is a diagram 500 illustrating an example of sensing based on measurements of both a set of first order reflected sensing signals 514 and a set of second order reflected sensing signals 526 using a RIS 504. The wireless node 502 may be a transmitter node. The wireless node 502 may be a TRP, a base station, or a UE. The wireless node 506 may be a receiver node. The wireless node 506 may be a TRP, a base station, or a UE.

The RIS 504 may be mounted on any suitable surface to reflect signals from the wireless node 502. For example, the RIS 504 may be mounted to an outer wall of a building. The RIS 504 may include a number of elements. The elements may be uniformly distributed across a surface of the RIS 504. The elements may be electrically controllable elements. Each element may have a reconfigurable electromagnetic characteristic, such as a reflection coefficient. The RIS 504 may configure one or more elements to reflect and modify an incident radio waveform directed towards a surface of the RIS 504. In one aspect, the RIS 504 may change a reflected direction of a reflected beam with respect to the incident beam. In another aspect, the RIS 504 may change a beam width of a reflected beam with respect to the incident beam. In other words, the RIS 504 may use elements distributed across its surface to control a direction or a beam property of a reflected beam with respect to an incident beam directed to its surface. The RIS 504 may form a sharper beam using a beamforming design, such as a lens-like beam. In some aspects, the RIS 504 may dynamically control each element in an array of elements on the surface of the RIS 504 (e.g., slot by slot control). A wireless system may use the RIS 504 to alter channel realization in a controlled manner, enhancing channel diversity. The increased diversity may provide robustness to channel blocking and/or channel fading. For example, the increased diversity may provide robustness for millimeter wave (mmWave) signals. The RIS 504 may be configured to reflect a plurality of wireless signals, such as LTE signals or NR signals. Using a RIS to reflect a signal may use less energy and may cost less than using a wireless relay or repeater to retransmit a signal.

The RIS 504 may have a RIS controller configured to control the RIS 504, such as a reflection coefficient of one or more elements of the RIS 504. The RIS 504 may include the RIS controller. A wireless node may include the RIS controller, such as the wireless node 502, or a base station disposed near the RIS 504. A core network of a wireless system, such as an LMF, may control the RIS 504 via a TRP disposed to have a line-of-sight (LOS) with an antenna of the RIS 504. The RIS controller may receive a control request or a signal from a wireless sensing node, such as the wireless node 502 or the wireless node 506. Such a wireless sensing node may discover and gain control of the RIS 504 by transmitting a RIS discovery request to a centralized RIS control node, or by receiving an indication of RIS information from a centralized RIS control node.

The wireless node 502 may transmit a transmitted signal 512 to the target object 505. The target object may reflect the transmitted signal 512 as the $1^{st}$ order reflected signal 514 to the wireless node 506. The wireless node 506 may receive the $1^{st}$ order reflected signal 514. The wireless node 506 may measure the $1^{st}$ order reflected signal 514 to perform sensing relative to the wireless node 502 and the target object 505. The wireless node 502 may transmit a transmitted signal 522 to the RIS 504. The RIS 504 may reflect the transmitted signal 522 as the $1^{st}$ order reflected signal 524 to the target object 505. The target object 505 may reflect the $1^{st}$ order reflected signal 524 as the $2^{nd}$ order reflected signal 526 to the wireless node 506. The wireless node 506 may receive the $2^{nd}$ order reflected signal 526. The wireless node 506 may measure the $2^{nd}$ order reflected signal 526 to perform sensing relative to the wireless node 502, the RIS 504, and the target object 505. The wireless node 502 may configure the transmitted signal 512 differently than the transmitted signal 522 to enable the wireless node 506 to differentiate between the $1^{st}$ order reflected signal 514 and the $2^{nd}$ order reflected signal 526.

FIG. 5B is a diagram 550 illustrating an example of sensing based on measurements of both a set of first order reflected sensing signals 514 and a set of second order reflected sensing signals 576 using a VTRP 556 generated using a reflector 554. The reflector 554 may be any object that provides a static reflection of at least a threshold amount of the transmitted signal 522 from the wireless node 502. In one aspect, the reflector 554 may be a RIS having static elements (e.g., the elements are not dynamically reconfigured by the wireless node 502 or the wireless node 506 during the sensing period). In one aspect, the reflector 554 may be a glass façade of a structure. In some aspects, a wireless system may perform tests with sensing beams from wireless nodes in various locations to determine properties of the reflector 554, such as a location of the reflector 554, a position of the reflector 554, one or more reflecting angles of the reflector 554, or a size and shape of a reflecting surface of the reflector 554. The VTRP 556 may be considered a virtual position of the wireless node 502 when the transmitted signal 522 reflects off of the reflector 554. In other words, the wireless node 506 may treat the $2^{nd}$ order reflected signal 576 off of the target object 505 as a $1^{st}$ order reflected signal from the VTRP 556 for sensing measurement purposes.

When the wireless node 506 measures a $2^{nd}$ order reflected signal 576, the wireless node 506 may consider the $2^{nd}$ order reflected signal 576 as a $1^{st}$ order reflection from the VTRP 556. The wireless node 506 may calculate the position of the VTRP 556 based on the known positions of the wireless node 502 and the reflector 554. The wireless node 502 may transmit a transmitted signal 512 to the target object 505. The target object may reflect the transmitted signal 512 as the $1^{st}$ order reflected signal 514 to the wireless node 506. The wireless node 506 may receive the $1^{st}$ order reflected signal 514. The wireless node 506 may measure the $1^{st}$ order reflected signal 514 to perform sensing relative to the wireless node 502 and the target object 505. The wireless node 502 may transmit a transmitted signal 522 to the reflector 554. The reflector 554 may reflect the transmitted signal 522 as the $1^{st}$ order reflected signal 574 to the target object 505. The target object 505 may reflect the $1^{st}$ order reflected signal 574 as the $2^{nd}$ order reflected signal 576 to the wireless node 506. The wireless node 506 may receive the $2^{nd}$ order reflected signal 576. The wireless node 506 may measure the $2^{nd}$ order reflected signal 576 to perform sensing relative to the VTRP 556 and the target object 505. The wireless node 506 may treat the reflector 554 as a VTRP 556 that transmits a signal 584 which reflects off of the target object 505 to produce the $2^{nd}$ order reflected signal 576.

While FIG. 5A and FIG. 5B show one reflecting surface (RIS 504 in FIG. 5A and reflector 554 in FIG. 5B) a plurality of reflecting surfaces may be used in a wireless sensing system to improve measurements of the target object 505, and to increase the number of available reflecting paths to measure the target object 505. While FIG. 5A and FIG. 5B show the wireless node 506 measuring a $1^{st}$ order reflected signal and a $2^{nd}$ order reflected signal, the wireless node 506 may measure a reflected signal of any number of orders on a reflected path, for example a $3^{rd}$, $4^{th}$, or $5^{th}$ order reflected signal using a plurality of reflecting surfaces.

Figure 6:
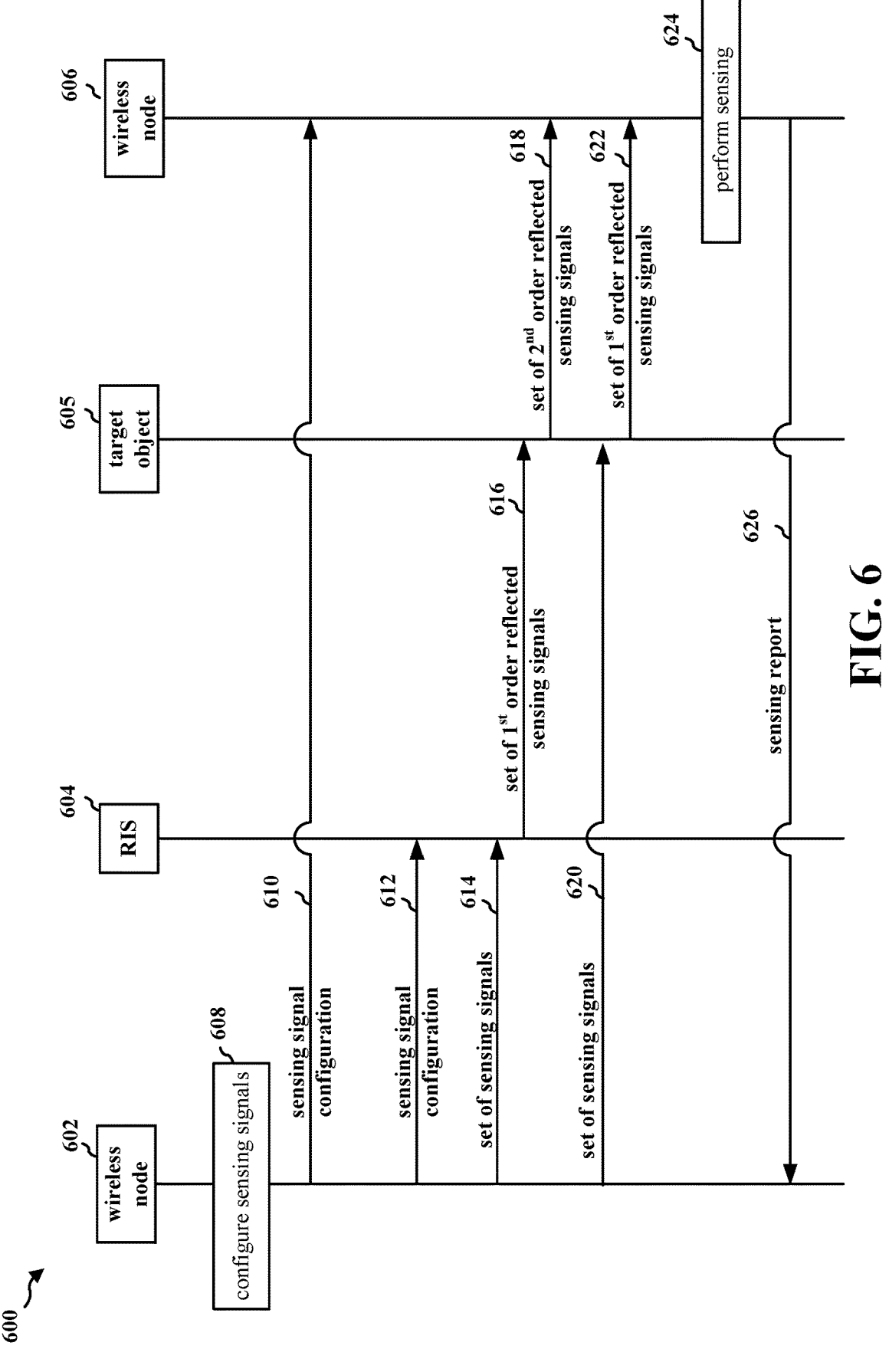
FIG. 6 is a connection flow diagram illustrating an example of sensing using controlled first and second order reflections with a RIS in a bistatic configuration.

FIG. 6 is a connection flow diagram 600 illustrating an example of sensing using controlled first and second order reflections transmitted using the wireless node 602 via a RIS 604 in a bistatic configuration with the wireless node 606.

The wireless node 602 may have a line-of-sight (LOS) path to the RIS 604 and to the target object 605. The wireless node 602 may have a LOS path to the wireless node 606, or may be able to transmit configurations, such as the sensing signal configuration 610, to the wireless node 606 via an alternative path, such as via a network node or an LMF.

At 608 the wireless node 602 may configure sensing signals for detecting a target object 605 using a plurality of reflection paths, or for detecting target objects within an area within which the target object 605 is located using a plurality of reflection paths. The wireless node 602 may configure a first reflection path having a set of sensing signals 620 from the wireless node 602 to the target object 605, and a set of $1^{st}$ order reflected sensing signals 622 from the target object 605 to the wireless node 606. The wireless node 602 may configure a second reflection path having a set of sensing signals 614 from the wireless node 602 to the RIS 604, a set of $1^{st}$ order reflected sensing signals 616 from the RIS 604 to the target object 605, and a set of $2^{nd}$ order reflected sensing signals 618 from the target object 605 to the wireless node 606. In some aspects, the wireless node 602 may configure any number of sensing signals for any number of reflection paths between the wireless node 602 to the target object 605 and to the wireless node 606. In some aspects, the wireless node 602 may select a subset of reflection paths out of a plurality of selection paths to sense the target object 605. In some aspects, the wireless node 502 may configure the sensing signals in response to determining the existence, location, and/or coverage of a reflecting surface (e.g., the RIS 604 or a static reflector) to determine if a plurality of reflection paths may be configured for the target object 605. The wireless node 602 may configure the first reflection path including the set of sensing signals 620 and the set of $1^{st}$ order reflected sensing signals 622 in response to determining that there is a LOS path between the wireless node 602 and an area about the target object 605, and that there is a LOS path between an area about the target object 605 and the wireless node 606. The wireless node 602 may configure the second reflection path including the set of sensing signals 614, the set of $1^{st}$ order reflected sensing signals 616, and the set of $2^{nd}$ order reflected sensing signals 618 in response to determining that there is a LOS path between the wireless node 602 and the RIS 604, a LOS path between the RIS 604 and an area about the target object 605, and a LOS path between an area about the target object 605 and the wireless node 606. In some aspects, the wireless node 602 may configure a control of the RIS 604 to direct the set of $1^{st}$ order reflected sensing signals 616 towards the target object 605, or a coverage area about the target object 605. In some aspects, the wireless node 602 may configure the sensing signals at 608 in response to receiving a sensing request from a sensing entity, such as an LMF or network node of a core network. The sensing request may indicate an area of interest about the target object 605. In response to the request, the wireless node 602 may determine that the RIS 604 is available as a reflecting surface for sensing the target object 605, or a coverage area about the target object 605, and may configure the reflection paths accordingly.

The wireless node 602 may transmit a sensing signal configuration 610 to the wireless node 606. The wireless node 606 may receive the sensing signal configuration 610. The sensing signal configuration 610 may be transmitted directly to the wireless node 606 or may be transmitted indirectly to the wireless node 606 via one or more intermediary devices, such as a UE or a network node. The sensing signal configuration 610 may include a configuration of the set of sensing signals 614. The sensing signal configuration 610 may include an indication of a sensing path (i.e., reflection path) from the wireless node 602 to the wireless node 606 via the RIS 604 and the target object 605, such as the path of the set of sensing signals 614 from the wireless node 602 to the RIS 604, the path of the set of $1^{st}$ order reflected sensing signals 616 from the RIS 604 to the target object 605, and the path of the set of $2^{nd}$ order reflected sensing signals 618 from the target object 605 to the wireless node 606. The sensing signal configuration 610 may include a configuration of the set of sensing signals 620. The sensing signal configuration 610 may include an indication of a sensing path from the wireless node 602 to the wireless node 606 via the target object 605, such as the path of the set of sensing signals 620 from the wireless node 602 to the target object 605, and the path of the set of $1^{st}$ order reflected sensing signals 622 from the target object 605 to the wireless node 606. The sensing signal configuration 610 may include an indication of the location of the RIS 604. The sensing signal configuration 610 may include an indication of a location about the target object 605. The sensing signal configuration 610 may include a coverage of the RIS 604 with respect to the wireless node 602, such as a LOS ability of the RIS to reach areas about the target object 605, an angle of the RIS 604 relative to the wireless node 602, and a scatter adjustability of the RIS 604.

The sensing signal configuration 610 may include a time-of-arrival (TOA) report mode, such as whether the wireless node 606 should perform a cluster-based TOA report. The sensing signal configuration 610 may include an indication of whether a set of sensing signals is transmitted using a burst transmission. The sensing signal configuration 610 may include an indication of what kind of beams are used for a set of sensing signals. The sensing signal configuration 610 may include an indication of one or more attributes of a sensing signal, for example a first RS for a first set of sensing signals and a second RS, different from the first RS, for the second set of sensing signals, or a first resource for a first set of sensing signals, and a second resource, different from the first resource, for the second set of sensing signals. The sensing signal configuration 610 may include an indication of the type of reflector used (e.g., whether the reflector is a RIS or a static reflector), and a position of each reflector. The sensing signal configuration 610 may be transmitted in a plurality of manners. In one aspect, the wireless node 602 may transmit the sensing signal configuration 610 as a radio resource control (RRC) message, a medium access control (MAC) control element (MAC-CE), or DCI. In one aspect, the wireless node 602 may broadcast the sensing signal configuration 610 as a broadcasted message (e.g., as system information to a plurality of UEs). In one aspect, the wireless node 602 may transmit the sensing signal configuration 610 as a backhaul message via a network connection, for example if the wireless node 602 and the wireless node 606 are both TRPs of a common network.

The sensing signal configuration 610 may include an indication for the wireless node 606 to generate a cluster-based path report. The indication may include one or more settings for the wireless node 606 to use, such as a clustering method (e.g., K-means clustering, density-based spatial clustering of applications with noise (DBSCAN) clustering), a delay threshold, an AoA threshold, a number of representative reflection paths, or a metric for reflection path selection. The delay threshold or the AoA threshold may be used to differentiate sets of reflected sensing signals, as one set of signals may be delayed as compared to the other set of sensing signals (e.g., the wireless node 606 may receive the set of $1^{st}$ order reflected sensing signals 622 before receiving the set of $2^{nd}$ order reflected sensing signals 618), or one set of signals may have a different AoA than the other set of sensing signals. In some aspects, the metric for reflection path selection may indicate for the wireless node 606 to select the first path and the last path as representative paths for each cluster, or may indicate for the wireless node 606 to select the strongest measured power (e.g., reference signal received power (RSRP)) as a representative path for each cluster.

The wireless node 602 may transmit a sensing signal configuration 612 to the RIS 604. The RIS 604 may receive the sensing signal configuration 612. The sensing signal configuration 612 may include a configuration of the set of sensing signals 614. The sensing signal configuration 610 may include an indication of a sensing path from the wireless node 602 to the target object 605 via the RIS 604, such as the path of the set of sensing signals 614 from the wireless node 602 to the RIS 604, and the path of the set of $1^{st}$ order reflected sensing signals 616 from the RIS 604 to the target object 605. The sensing signal configuration 612 may include an indication for the RIS 604 to modify the reflected sensing signal using watermarking to differentiate the set of $1^{st}$ order reflected sensing signals 616 (and thus the set of $2^{nd}$ order reflected sensing signals 618) from the set of $1^{st}$ order reflected sensing signals 622. For example, the RIS 604 may add a header to the set of $1^{st}$ order reflected sensing signals 616 indicating the reflection path. The watermarking may also be indicated in the sensing signal configuration 610 transmitted to the wireless node 606 so that the wireless node 606 may detect the watermarking pattern to differentiate the set of $2^{nd}$ order reflected sensing signals from other received sensing signals. In some aspects, the wireless node 602 may be configured to transmit the set of sensing signals 614 or the set of sensing signals 620 with a watermarking pattern, and the RIS 604 may stack an additional watermarking pattern on the set of sensing signals 614. The watermarking pattern used for the set of sensing signals 614 may be different than the watermarking pattern used for the set of sensing signals 620.

The wireless node 602 may transmit the set of sensing signals 614 to the RIS 604 based on the sensing signal configuration 610 or the sensing signal configuration 612. The RIS 604 may reflect the set of sensing signals 614 as the set of $1^{st}$ order reflected sensing signals 616 to the target object 605. The target object 605 may reflect the set of $1^{st}$ order reflected sensing signals 616 as the set of $2^{nd}$ order reflected sensing signals 618 at the wireless node 606. The wireless node 602 may transmit the set of sensing signals 620 to the target object 605. The target object 605 may reflect the set of sensing signals 620 as the set of $1^{st}$ order reflected sensing signals 622 at the wireless node 606.

The wireless node 602 may transmit the set of sensing signals 614 and the set of sensing signals 620 in a plurality of manners. In one aspect, the wireless node 602 may transmit the set of sensing signals 614 and the set of sensing signals 620 simultaneously in a broader beam that covers both the RIS 604 and the target object 605. The wireless node 602 may use such a broad beam with less beamforming gain in both directions. In another aspect, the wireless node 602 may transmit the set of sensing signals 614 and the set of sensing signals 620 simultaneously as two narrow beams with the same sensing resources on two different beams. In another aspect, the wireless node 602 may transmit the set of sensing signals 614 and the set of sensing signals 620 simultaneously as two narrow beams with different sensing resources on two different beams. In another aspect, the wireless node 602 may transmit the set of sensing signals 614 and the set of sensing signals 620 with time domain multiplexing (TDM) as two narrow beams transmitted in different time periods. In some aspects, the wireless node 602 may be configured to sense the target object 605 while the target object 605 is moving. As such, the target object 605 may be in a first position when the set of $1^{st}$ order reflected sensing signals 616 reach the target object 605, and may be in a second position when the set of sensing signals 620 reach the target object 605. In such an aspect, the wireless node 602 may schedule the measurement of each of the set of $2^{nd}$ order reflected sensing signals 618 and the set of $1^{st}$ order reflected sensing signals 622 independently, while the processing of the measurements may be performed jointly by the wireless node 606 or by another wireless device (e.g., a sensing entity that receives a report of the measurements from the wireless node 606).

At 624, the wireless node 606 may perform sensing on the set of $1^{st}$ order reflected sensing signals 622 and the set of $2^{nd}$ order reflected sensing signals 618 based on the sensing signal configuration 610. In some aspects, the wireless node 606 may generate a path report based on the sensing, such as a cluster-based path report. For example, the wireless node 606 may report one or more representative paths from each target object sensed, such as the target object 605. Each target object may have a separate path. The cluster-based path report may indicate each path. For example, the cluster-based path report may include a first indication of the first reflection path including the set of sensing signals 620 and the set of $1^{st}$ order reflected sensing signals 622 and a second indication of the second reflection path including the set of sensing signals 614, the set of $1^{st}$ order reflected sensing signals 616, and the set of $2^{nd}$ order reflected sensing signals 618. The wireless node 606 may differentiate each reflection path based on a delay of the reflected sensing signals, or based on the angle of arrival (AoA) of the reflected sensing signals. The wireless node 606 may generate the cluster-based path report based on one or more settings of the sensing signal configuration 610. The wireless node 606 may transmit the sensing report 626 to the wireless node 602. The wireless node 602 may receive the sensing report 626 from the wireless node 606. In some aspects, the wireless node 606 may transmit a sensing report to a sensing entity, such as an LMF or a network node of a core network.

While the wireless node 602 and the wireless node 606 are shown in FIG. 6 as a transmitter node and a receiver node, respectively, the wireless node 602 and the wireless node 606 may be representative of a single co-located device, such as a base station or a UE performing monostatic sensing. As such, the configuration of the sensing signals at 608 and the sensing performed at 624 may be performed by the same device. Such a wireless device may not transmit the sensing signal configuration 610, as the device already knows the configuration of the sensing signals.

Figure 7:
FIG. 7 is a connection flow diagram illustrating an example of sensing using controlled first and second order reflections with a RIS in a monostatic configuration.

FIG. 7 is a connection flow diagram 700 illustrating an example of sensing using controlled first and second order reflections transmitted using the wireless node 702 via a RIS 704 in a monostatic configuration. The wireless node 702 may have an LOS path to the RIS 704 and to the target object 705. At 708 the wireless node 702 may configure sensing signals for detecting a target object 705 using a plurality of reflection paths, or for detecting target objects within an area within which the target object 705 is located using a plurality of reflection paths. The wireless node 702 may configure a first reflection path having a set of sensing signals 720 from the wireless node 702 to the target object 705, and a set of $1^{st}$ order reflected sensing signals 722 from the target object

705 to the wireless node 702. The wireless node 702 may configure a second reflection path having a set of sensing signals 714 from the wireless node 702 to the RIS 704, a set of $1^{st}$ order reflected sensing signals 716 from the RIS 704 to the target object 705, and a set of $2^{nd}$ order reflected sensing signals 718 from the target object 705 to the wireless node 702. In some aspects, the wireless node 702 may configure any number of sensing signals for any number of reflection paths between the wireless node 702 to the target object 705 and back to the wireless node 702. In some aspects, the wireless node 702 may select a subset of reflection paths out of a plurality of selection paths to sense the target object 705. In some aspects, the wireless node 502 may configure the sensing signals in response to determining the existence, location, and/or coverage of a reflecting surface (e.g., the RIS 704 or a static reflector) to determine if a plurality of reflection paths may be configured for the target object 705. The wireless node 702 may configure the first reflection path including the set of sensing signals 720 and the set of $1^{st}$ order reflected sensing signals 722 in response to determining that there is a LOS path between the wireless node 702 and an area about the target object 705, and that there is a LOS path between an area about the target object 705 and the wireless node 702. The wireless node 702 may configure the second reflection path including the set of sensing signals 714, the set of $1^{st}$ order reflected sensing signals 716, and the set of $2^{nd}$ order reflected sensing signals 718 in response to determining that there is a LOS path between the wireless node 702 and the RIS 704, a LOS path between the RIS 704 and an area about the target object 705, and a LOS path between an area about the target object 705 and the wireless node 702. In some aspects, the wireless node 702 may configure a control of the RIS 704 to direct the set of $1^{st}$ order reflected sensing signals 716 towards the target object 705, or a coverage area about the target object 705. In some aspects, the wireless node 702 may configure the sensing signals at 708 in response to receiving a sensing request from a sensing entity, such as an LMF or network node of a core network. The sensing request may indicate an area of interest about the target object 605. In response to the request, the wireless node 702 may determine that the RIS 704 is available as a reflecting surface for sensing the target object 705, or a coverage area about the target object 705, and may configure the reflection paths accordingly. The wireless node 702 may output the configuration to a module for performing sensing on received sensing signals at 724.

The wireless node 702 may transmit a sensing signal configuration 712 to the RIS 704. The RIS 704 may receive the sensing signal configuration 712. The sensing signal configuration 712 may include a configuration of the set of sensing signals 714. The sensing signal configuration may include an indication of a sensing path from the wireless node 702 to the target object 705 via the RIS 704, such as the path of the set of sensing signals 714 from the wireless node 702 to the RIS 704, and the path of the set of $1^{st}$ order reflected sensing signals 716 from the RIS 704 to the target object 705. The sensing signal configuration 712 may include an indication for the RIS 704 to modify the reflected sensing signal using watermarking to differentiate the set of $1^{st}$ order reflected sensing signals 716 (and thus the set of $2^{nd}$ order reflected sensing signals 718) from the set of $1^{st}$ order reflected sensing signals 722. For example, the RIS 704 may add a header to the set of $1^{st}$ order reflected sensing signals 716 indicating the reflection path. The wireless node 702 may detect the watermarking pattern to differentiate the set of $2^{nd}$ order reflected sensing signals from other received sensing signals. In some aspects, the wireless node 702 may be configured to transmit the set of sensing signals 714 or the set of sensing signals 720 with a watermarking pattern, and the RIS 704 may stack an additional watermarking pattern on the set of sensing signals 714. The watermarking pattern used for the set of sensing signals 714 may be different than the watermarking pattern used for the set of sensing signals 720.

The wireless node 702 may transmit the set of sensing signals 714 to the RIS 704 based on the sensing signal configuration 712. The RIS 704 may reflect the set of sensing signals 714 as the set of $1^{st}$ order reflected sensing signals 716 to the target object 705. The target object 705 may reflect the set of $1^{st}$ order reflected sensing signals 716 as the set of $2^{nd}$ order reflected sensing signals 718 at the wireless node 702. The wireless node 702 may transmit the set of sensing signals 720 to the target object 705. The target object 705 may reflect the set of sensing signals 720 as the set of $1^{st}$ order reflected sensing signals 722 at the wireless node 702.

The wireless node 702 may transmit the set of sensing signals 714 and the set of sensing signals 720 in a plurality of manners. In one aspect, the wireless node 702 may transmit the set of sensing signals 714 and the set of sensing signals 720 simultaneously in a broader beam that covers both the RIS 704 and the target object 705. The wireless node 702 may use such a broad beam with less beamforming gain in both directions. In another aspect, the wireless node 702 may transmit the set of sensing signals 714 and the set of sensing signals 720 simultaneously as two narrow beams with the same sensing resources on two different beams. In another aspect, the wireless node 702 may transmit the set of sensing signals 714 and the set of sensing signals 720 simultaneously as two narrow beams with different sensing resources on two different beams. In another aspect, the wireless node 702 may transmit the set of sensing signals 714 and the set of sensing signals 720 with TDM as two narrow beams transmitted in different time periods. In some aspects, the wireless node 702 may be configured to sense the target object 705 while the target object 705 is moving. As such, the target object 705 may be in a first position when the set of $1^{st}$ order reflected sensing signals 716 reach the target object 705, and may be in a second position when the set of sensing signals 720 reach the target object 705. In such an aspect, the wireless node 702 may schedule the measurement of each of the set of $2^{nd}$ order reflected sensing signals 718 and the set of $1^{st}$ order reflected sensing signals 722 independently, while the processing of the measurements may be performed jointly by the wireless node 702 or by another wireless device (e.g., a sensing entity that receives a report of the measurements from the wireless node 702).

At 724, the wireless node 702 may perform sensing on the set of $1^{st}$ order reflected sensing signals 722 and the set of $2^{nd}$ order reflected sensing signals 718 based on the sensing signal configuration 712. In some aspects, the wireless node 702 may generate a path report based on the sensing, such as a cluster-based path report. For example, the wireless node 702 may report one or more representative paths from each target object sensed, such as the target object 705. Each target object may have a separate path. The cluster-based path report may indicate each path. For example, the cluster-based path report may include a first indication of the first reflection path including the set of sensing signals 720 and the set of $1^{st}$ order reflected sensing signals 722 and a second indication of the second reflection path including the set of sensing signals 714, the set of $1^{st}$ order reflected sensing signals 716, and the set of $2^{nd}$ order reflected sensing signals 718. The wireless node 702 may differentiate each reflection path based on a delay of the reflected sensing signals, or based on the AoA of the reflected sensing signals. The wireless node 702 may generate the cluster-based path report based on one or more settings of the sensing signal configuration. In some aspects, the wireless node 702 may transmit a sensing report to a sensing entity, such as an LMF or a network node of a core network.

Figure 8:
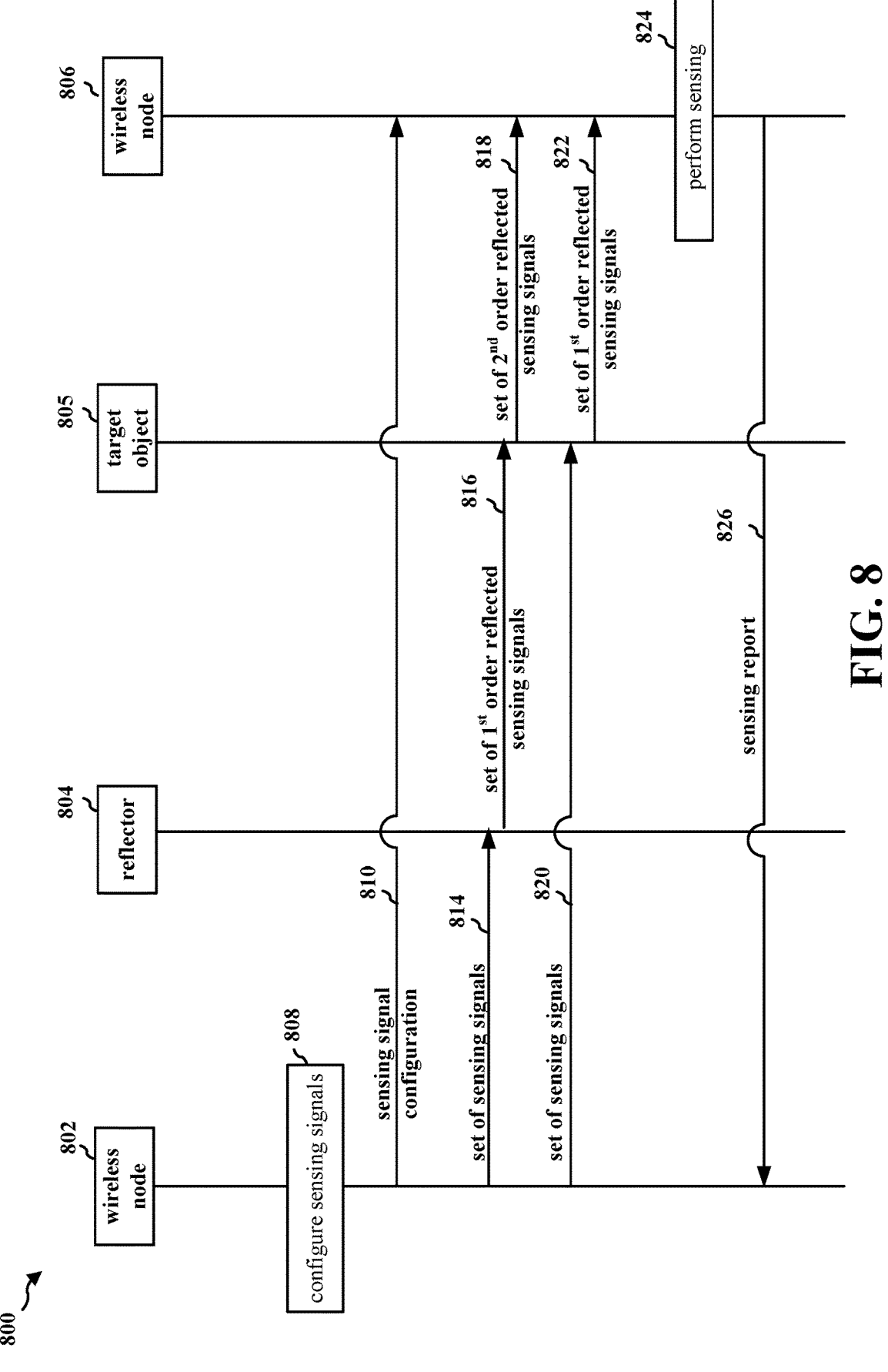
FIG. 8 is a connection flow diagram illustrating an example of sensing using controlled first and second order reflections with a reflector in a bistatic configuration.

FIG. 8 is a connection flow diagram 800 illustrating an example of sensing using controlled first and second order reflections transmitted using the wireless node 802 via a reflector 804 in a bistatic configuration with the wireless node 806. The wireless node 802 may have an LOS path to the reflector 804 and to the target object 805. The wireless node 802 may have a LOS path to the wireless node 806, or may be able to transmit configurations, such as the sensing signal configuration 810, to the wireless node 806 via an alternative path, such as via a network node or an LMF.

At 808 the wireless node 802 may configure sensing signals for detecting a target object 805 using a plurality of reflection paths, or for detecting target objects within an area within which the target object 805 is located using a plurality of reflection paths. The wireless node 802 may configure a first reflection path having a set of sensing signals 820 from the wireless node 802 to the target object 805, and a set of $1^{st}$ order reflected sensing signals 822 from the target object 805 to the wireless node 806. The wireless node 802 may configure a second reflection path having a set of sensing signals 814 from the wireless node 802 to the reflector 804, a set of $1^{st}$ order reflected sensing signals 816 from the reflector 804 to the target object 805, and a set of $2^{nd}$ order reflected sensing signals 818 from the target object 805 to the wireless node 806. In some aspects, the wireless node 802 may configure any number of sensing signals for any number of reflection paths between the wireless node 802 to the target object 805 and to the wireless node 806. In some aspects, the wireless node 802 may select a subset of reflection paths out of a plurality of selection paths to sense the target object 805. In some aspects, the wireless node 502 may configure the sensing signals in response to determining the existence, location, and/or coverage of a reflecting surface (e.g., the reflector 804 or a RIS) to determine if a plurality of reflection paths may be configured for the target object 805. The wireless node 802 may configure the first reflection path including the set of sensing signals 820 and the set of $1^{st}$ order reflected sensing signals 822 in response to determining that there is a LOS path between the wireless node 802 and an area about the target object 805, and that there is a LOS path between an area about the target object 805 and the wireless node 806. The wireless node 802 may configure the second reflection path including the set of sensing signals 814, the set of $1^{st}$ order reflected sensing signals 816, and the set of $2^{nd}$ order reflected sensing signals 818 in response to determining that there is a LOS path between the wireless node 802 and the reflector 804, a LOS path between the reflector 804 and an area about the target object 805, and a LOS path between an area about the target object 805 and the wireless node 806. In some aspects, the wireless node 802 may configure a control of the reflector 804 to direct the set of $1^{st}$ order reflected sensing signals 816 towards the target object 805, or a coverage area about the target object 805. In some aspects, the wireless node 802 may configure the sensing signals at 808 in response to receiving a sensing request from a sensing entity, such as an LMF or network node of a core network. The sensing request may indicate an area of interest about the target object 605. In response to the request, the wireless node 802 may determine that the reflector 804 is available as a reflecting surface for sensing the target object 805, or a coverage area about the target object 805, and may configure the reflection paths accordingly.

The wireless node 802 may transmit a sensing signal configuration 810 to the wireless node 806. The wireless node 806 may receive the sensing signal configuration 810. The sensing signal configuration 810 may be transmitted directly to the wireless node 806 or may be transmitted indirectly to the wireless node 806 via one or more intermediary devices, such as a UE or a network node. The sensing signal configuration 810 may include a configuration of the set of sensing signals 814. The sensing signal configuration 810 may include an indication of a sensing path (i.e., reflection path) from the wireless node 802 to the wireless node 806 via the reflector 804 and the target object 805, such as the path of the set of sensing signals 814 from the wireless node 802 to the reflector 804, the path of the set of $1^{st}$ order reflected sensing signals 816 from the reflector 804 to the target object 805, and the path of the set of $2^{nd}$ order reflected sensing signals 818 from the target object 805 to the wireless node 806. The sensing signal configuration 810 may include a configuration of the set of sensing signals 820. The sensing signal configuration 810 may include an indication of a sensing path from the wireless node 802 to the wireless node 806 via the target object 805, such as the path of the set of sensing signals 820 from the wireless node 802 to the target object 805, and the path of the set of $1^{st}$ order reflected sensing signals 822 from the target object 805 to the wireless node 806. The sensing signal configuration 810 may include an indication of the location of the reflector 804. The sensing signal configuration 810 may include an indication of a location about the target object 805. The sensing signal configuration 810 may include a coverage of the reflector 804 with respect to the wireless node 802, such as a LOS ability of the RIS to reach areas about the target object 805, an angle of the reflector 804 relative to the wireless node 802, and a scatter adjustability of the reflector 804.

The sensing signal configuration 810 may include a TOA report mode, such as whether the wireless node 806 should perform a cluster-based TOA report. The sensing signal configuration 810 may include an indication of whether a set of sensing signals is transmitted using a burst transmission. The sensing signal configuration 810 may include an indication of what kind of beams are used for a set of sensing signals. The sensing signal configuration 810 may include an indication of one or more attributes of a sensing signal, for example a first RS for a first set of sensing signals and a second RS, different from the first RS, for the second set of sensing signals, or a first resource for a first set of sensing signals, and a second resource, different from the first resource, for the second set of sensing signals. The sensing signal configuration 810 may include an indication of the type of reflector used (e.g., whether the reflector is a RIS or a static reflector), and a position of each reflector. The sensing signal configuration 810 may be transmitted in a plurality of manners. In one aspect, the wireless node 802 may transmit the sensing signal configuration 810 as an RRC message, a MAC-CE, or DCI. In one aspect, the wireless node 802 may broadcast the sensing signal configuration 810 as a broadcasted message (e.g., as system information to a plurality of UEs). In one aspect, the wireless node 802 may transmit the sensing signal configuration 810 as a backhaul message via a network connection, for example if the wireless node 802 and the wireless node 806 are both TRPs of a common network.

The sensing signal configuration 810 may include an indication for the wireless node 806 to generate a cluster-based path report. The indication may include one or more settings for the wireless node 806 to use, such as a clustering method (e.g., K-means clustering, DBSCAN clustering), a delay threshold, an AoA threshold, a number of representative reflection paths, or a metric for reflection path selection. The delay threshold or the AoA threshold may be used to differentiate sets of reflected sensing signals, as one set of signals may be delayed as compared to the other set of sensing signals (e.g., the wireless node 806 may receive the set of $1^{st}$ order reflected sensing signals 822 before receiving the set of $2^{nd}$ order reflected sensing signals 818), or one set of signals may have a different AoA than the other set of sensing signals. In some aspects, the metric for reflection path selection may indicate for the wireless node 806 to select the first path and the last path as representative paths for each cluster, or may indicate for the wireless node 806 to select the strongest measured power (e.g., RSRP) as a representative path for each cluster.

The sensing signal configuration 810 may include an indication of a VTRP as a representative transmitter in lieu of the reflector 804. In other words, the sensing signal configuration 810 may indicate to the wireless node 806 that a VTRP having a position representative of the reflective path of the set of sensing signals 814 and the set of $1^{st}$ order reflected sensing signals 816 is transmitting the set of $1^{st}$ order reflected sensing signals 816. The wireless node 806 may then treat the set of $2^{nd}$ order reflected sensing signals 818 as a set of $1^{st}$ order sensing signals originating from the VTRP. The wireless node 802 may calculate a position of the VTRP based on the position of the wireless node 802, the position of the reflector 804, known properties of a reflecting surface of the reflector 804, and known properties of the transmission beam used for the set of sensing signals 814.

The wireless node 802 may transmit the set of sensing signals 814 to the reflector 804 based on the sensing signal configuration 810. The reflector 804 may reflect the set of sensing signals 814 as the set of $1^{st}$ order reflected sensing signals 816 to the target object 805. The target object 805 may reflect the set of $1^{st}$ order reflected sensing signals 816 as the set of $2^{nd}$ order reflected sensing signals 818 at the wireless node 806. The wireless node 802 may transmit the set of sensing signals 820 to the target object 805. The target object 805 may reflect the set of sensing signals 820 as the set of $1^{st}$ order reflected sensing signals 822 at the wireless node 806.

The wireless node 802 may transmit the set of sensing signals 814 and the set of sensing signals 820 in a plurality of manners. In one aspect, the wireless node 802 may transmit the set of sensing signals 814 and the set of sensing signals 820 simultaneously in a broader beam that covers both the reflector 804 and the target object 805. The wireless node 802 may use such a broad beam with less beamforming gain in both directions. In another aspect, the wireless node 802 may transmit the set of sensing signals 814 and the set of sensing signals 820 simultaneously as two narrow beams with the same sensing resources on two different beams. In another aspect, the wireless node 802 may transmit the set of sensing signals 814 and the set of sensing signals 820 simultaneously as two narrow beams with different sensing resources on two different beams. In another aspect, the wireless node 802 may transmit the set of sensing signals 814 and the set of sensing signals 820 with TDM as two narrow beams transmitted in different time periods. In some aspects, the wireless node 802 may be configured to sense the target object 805 while the target object 805 is moving.

As such, the target object 805 may be in a first position when the set of $1^{st}$ order reflected sensing signals 816 reach the target object 805, and may be in a second position when the set of sensing signals 820 reach the target object 805. In such an aspect, the wireless node 802 may schedule the measurement of each of the set of $2^{nd}$ order reflected sensing signals 818 and the set of $1^{st}$ order reflected sensing signals 822 independently, while the processing of the measurements may be performed jointly by the wireless node 806 or by another wireless device (e.g., a sensing entity that receives a report of the measurements from the wireless node 806).

At 824, the wireless node 806 may perform sensing on the set of $1^{st}$ order reflected sensing signals 822 and the set of $2^{nd}$ order reflected sensing signals 818 based on the sensing signal configuration 810. In some aspects, the wireless node 806 may treat the set of $2^{nd}$ order reflected sensing signals 818 as a set of $1^{st}$ order reflected sensing signals originating from a VTRP. In some aspects, the wireless node 806 may generate a path report based on the sensing, such as a cluster-based path report. For example, the wireless node 806 may report one or more representative paths from each target object sensed, such as the target object 805. Each target object may have a separate path. The cluster-based path report may indicate each path. For example, the cluster-based path report may include a first indication of the first reflection path including the set of sensing signals 820 and the set of $1^{st}$ order reflected sensing signals 822 and a second indication of the second reflection path including the set of sensing signals 814, the set of $1^{st}$ order reflected sensing signals 816, and the set of $2^{nd}$ order reflected sensing signals 818. The wireless node 806 may differentiate each reflection path based on a delay of the reflected sensing signals, or based on the AoA of the reflected sensing signals. The wireless node 806 may generate the cluster-based path report based on one or more settings of the sensing signal configuration 810. The wireless node 806 may transmit the sensing report 826 to the wireless node 802. The wireless node 802 may receive the sensing report 826 from the wireless node 806. In some aspects, the wireless node 806 may transmit a sensing report to a sensing entity, such as an LMF or a network node of a core network.

While the wireless node 802 and the wireless node 806 are shown in FIG. 8 as a transmitter node and a receiver node, respectively, the wireless node 802 and the wireless node 806 may be representative of a single co-located device, such as a base station or a UE performing monostatic sensing. As such, the configuration of the sensing signals at 808 and the sensing performed at 824 may be performed by the same device. Such a wireless device may not transmit the sensing signal configuration 810, as the device already knows the configuration of the sensing signals.

Figure 9:
FIG. 9 is a connection flow diagram illustrating an example of sensing using controlled first and second order reflections with a reflector in a monostatic configuration.

FIG. 9 is a connection flow diagram 900 illustrating an example of sensing using controlled first and second order reflections transmitted using the wireless node 902 via a reflector 904 in a monostatic configuration. The wireless node 902 may have an LOS path to the reflector 904 and to the target object 905.

At 908 the wireless node 902 may configure sensing signals for detecting a target object 905 using a plurality of reflection paths, or for detecting target objects within an area within which the target object 905 is located using a plurality of reflection paths. The wireless node 902 may configure a first reflection path having a set of sensing signals 920 from the wireless node 902 to the target object 905, and a set of $1^{st}$ order reflected sensing signals 922 from the target object 905 to the wireless node 902. The wireless node 902 may configure a second reflection path having a set of sensing signals 914 from the wireless node 902 to the reflector 904, a set of $1^{st}$ order reflected sensing signals 916 from the reflector 904 to the target object 905, and a set of $2^{nd}$ order reflected sensing signals 918 from the target object 905 to the wireless node 902. In some aspects, the wireless node 902 may configure any number of sensing signals for any number of reflection paths between the wireless node 902 to the target object 905 and back to the wireless node 902. In some aspects, the wireless node 902 may select a subset of reflection paths out of a plurality of selection paths to sense the target object 905. In some aspects, the wireless node 502 may configure the sensing signals in response to determining the existence, location, and/or coverage of a reflecting surface (e.g., the reflector 904 or a static reflector) to determine if a plurality of reflection paths may be configured for the target object 905. The wireless node 902 may configure the first reflection path including the set of sensing signals 920 and the set of $1^{st}$ order reflected sensing signals 922 in response to determining that there is a LOS path between the wireless node 902 and an area about the target object 905, and that there is a LOS path between an area about the target object 905 and the wireless node 902. The wireless node 902 may configure the second reflection path including the set of sensing signals 914, the set of $1^{st}$ order reflected sensing signals 916, and the set of $2^{nd}$ order reflected sensing signals 918 in response to determining that there is a LOS path between the wireless node 902 and the reflector 904, a LOS path between the reflector 904 and an area about the target object 905, and a LOS path between an area about the target object 905 and the wireless node 902. In some aspects, the wireless node 902 may configure a control of the reflector 904 to direct the set of $1^{st}$ order reflected sensing signals 916 towards the target object 905, or a coverage area about the target object 905. In some aspects, the wireless node 902 may configure the sensing signals at 908 in response to receiving a sensing request from a sensing entity, such as an LMF or network node of a core network. The sensing request may indicate an area of interest about the target object 605. In response to the request, the wireless node 902 may determine that the reflector 904 is available as a reflecting surface for sensing the target object 905, or a coverage area about the target object 905, and may configure the reflection paths accordingly.

The sensing signal configuration may include an indication of a VTRP as a representative transmitter in lieu of the reflector 804. In other words, the sensing signal configuration may indicate that a VTRP having a position representative of the reflective path of the set of sensing signals 814 and the set of $1^{st}$ order reflected sensing signals 816 is transmitting the set of $1^{st}$ order reflected sensing signals 816. The wireless node 802 may treat the set of $2^{nd}$ order reflected sensing signals 818 as a set of $1^{st}$ order sensing signals originating from the VTRP. The wireless node 802 may calculate a position of the VTRP based on the position of the wireless node 802, the position of the reflector 804, known properties of a reflecting surface of the reflector 804, and known properties of the transmission beam used for the set of sensing signals 814. The wireless node 902 may output the configuration to a module for performing sensing on received sensing signals at 924.

The wireless node 902 may transmit the set of sensing signals 914 to the reflector 904 based on the sensing signal configuration at 908. The reflector 904 may reflect the set of sensing signals 914 as the set of $1^{st}$ order reflected sensing signals 916 to the target object 905. The target object 905 may reflect the set of $1^{st}$ order reflected sensing signals 916 as the set of $2^{nd}$ order reflected sensing signals 918 at the wireless node 902. The wireless node 902 may transmit the set of sensing signals 920 to the target object 905. The target object 905 may reflect the set of sensing signals 920 as the set of $1^{st}$ order reflected sensing signals 922 at the wireless node 902.

The wireless node 902 may transmit the set of sensing signals 914 and the set of sensing signals 920 in a plurality of manners. In one aspect, the wireless node 902 may transmit the set of sensing signals 914 and the set of sensing signals 920 simultaneously in a broader beam that covers both the reflector 904 and the target object 905. The wireless node 902 may use such a broad beam with less beamforming gain in both directions. In another aspect, the wireless node 902 may transmit the set of sensing signals 914 and the set of sensing signals 920 simultaneously as two narrow beams with the same sensing resources on two different beams. In another aspect, the wireless node 902 may transmit the set of sensing signals 914 and the set of sensing signals 920 simultaneously as two narrow beams with different sensing resources on two different beams. In another aspect, the wireless node 902 may transmit the set of sensing signals 914 and the set of sensing signals 920 with TDM as two narrow beams transmitted in different time periods. In some aspects, the wireless node 902 may be configured to sense the target object 905 while the target object 905 is moving. As such, the target object 905 may be in a first position when the set of $1^{st}$ order reflected sensing signals 916 reach the target object 905, and may be in a second position when the set of sensing signals 920 reach the target object 905. In such an aspect, the wireless node 902 may schedule the measurement of each of the set of $2^{nd}$ order reflected sensing signals 918 and the set of $1^{st}$ order reflected sensing signals 922 independently, while the processing of the measurements may be performed jointly by the wireless node 902 or by another wireless device (e.g., a sensing entity that receives a report of the measurements from the wireless node 902).

At 924, the wireless node 902 may perform sensing on the set of $1^{st}$ order reflected sensing signals 922 and the set of $2^{nd}$ order reflected sensing signals 918 based on the sensing signal configuration configured at 908. In some aspects, the wireless node 806 may treat the set of $2^{nd}$ order reflected sensing signals 818 as a set of $1^{st}$ order reflected sensing signals originating from a VTRP. In some aspects, the wireless node 902 may generate a path report based on the sensing, such as a cluster-based path report. For example, the wireless node 902 may report one or more representative paths from each target object sensed, such as the target object 905. Each target object may have a separate path. The cluster-based path report may indicate each path. For example, the cluster-based path report may include a first indication of the first reflection path including the set of sensing signals 920 and the set of $1^{st}$ order reflected sensing signals 922 and a second indication of the second reflection path including the set of sensing signals 914, the set of $1^{st}$ order reflected sensing signals 916, and the set of $2^{nd}$ order reflected sensing signals 918. The wireless node 902 may differentiate each reflection path based on a delay of the reflected sensing signals, or based on the AoA of the reflected sensing signals. The wireless node 902 may generate the cluster-based path report based on one or more settings of the sensing signal configuration configured at 908. In some aspects, the wireless node 902 may transmit a sensing report to a sensing entity, such as an LMF or a network node of a core network.

FIG. 10 is a flowchart 1000 of a method of wireless communication. The method may be performed by a first wireless device (e.g., the UE 104, the UE 350; the wireless node 402, the wireless node 406, the wireless node 408, the wireless node 502, the wireless node 602, the wireless node 702, the wireless node 802, the wireless node 902; the base station 102, the base station 310; the apparatus 1604; the network entity 1602, the network entity 1702, the network entity 1860). At 1002, the first wireless device may output a sensing signal configuration for performing sensing on a first reflected sensing signal from the first wireless device via a target object and a second reflected sensing signal from a reflective object via the target object based on a set of sensing signals. For example, 1002 may be performed by the wireless node 602 in FIG. 6, which may transmit the sensing signal configuration 610 for performing sensing on the set of $1^{st}$ order reflected sensing signals 622 from the wireless node 602 via the target object 605 and the set of $2^{nd}$ order reflected sensing signals 618 from the RIS 604 via the target object 605 based on the set of sensing signals which include the set of sensing signals 614 and the set of sensing signals 620. 1002 may be performed by the wireless node 702 in FIG. 7, which may output a sensing signal configuration configured at 708 for performing sensing on the set of $1^{st}$ order reflected sensing signals 722 from the wireless node 702 via the target object 705 and the set of $2^{nd}$ order reflected sensing signals 718 from the RIS 704 via the target object 705 based on the set of sensing signals which include the set of sensing signals 714 and the set of sensing signals 720. Moreover, 1002 may be performed by the component 198 in FIG. 1, 3, 16, 17, or 18.

At 1004, the first wireless device may transmit the set of sensing signals to the target object and the reflective object. The reflective object may reflect at least one of the set of sensing signals to the target object based on the sensing signal configuration. For example, 1004 may be performed by the wireless node 602 in FIG. 6, which may transmit the set of sensing signals 620 to the target object 605 and may transmit the set of sensing signals 614 to the RIS 604. The RIS 604 may reflect the set of sensing signals 614 to the target object 605 based on the sensing signal configuration 610. Moreover, 1004 may be performed by the component 198 in FIG. 1, 3, 16, 17, or 18.

FIG. 11 is a flowchart 1100 of a method of wireless communication. The method may be performed by a first wireless device (e.g., the UE 104, the UE 350; the wireless node 402, the wireless node 406, the wireless node 408, the wireless node 502, the wireless node 602, the wireless node 702, the wireless node 802, the wireless node 902; the base station 102, the base station 310; the apparatus 1604; the network entity 1602, the network entity 1702, the network entity 1860). At 1102, the first wireless device may output a sensing signal configuration for performing sensing on a first reflected sensing signal from the first wireless device via a target object and a second reflected sensing signal from a reflective object via the target object based on a set of sensing signals. For example, 1102 may be performed by the wireless node 602 in FIG. 6, which may output the sensing signal configuration 610 for performing sensing on the set of $1^{st}$ order reflected sensing signals 622 from the wireless node 602 via the target object 605 and the set of $2^{nd}$ order reflected sensing signals 618 from the RIS 604 via the target object 605 based on the set of sensing signals which include the set of sensing signals 614 and the set of sensing signals 620. 1102 may be performed by the wireless node 702 in FIG. 7, which may output a sensing signal configuration configured at 708 for performing sensing on the set of $1^{st}$ order reflected sensing signals 722 from the wireless node 702 via the target object 705 and the set of $2^{nd}$ order reflected sensing signals 718 from the RIS 704 via the target object 705 based on the set of sensing signals which include the set of sensing signals 714 and the set of sensing signals 720. Moreover, 1102 may be performed by the component 198 in FIG. 1, 3, 16, 17, or 18.

At 1104, the first wireless device may transmit the set of sensing signals to the target object and the reflective object. The reflective object may reflect at least one of the set of sensing signals to the target object based on the sensing signal configuration. For example, 1104 may be performed by the wireless node 602 in FIG. 6, which may transmit the set of sensing signals 620 to the target object 605 and may transmit the set of sensing signals 614 to the RIS 604. The RIS 604 may reflect the set of sensing signals 614 to the target object 605 based on the sensing signal configuration 610. Moreover, 1104 may be performed by the component 198 in FIG. 1, 3, 16, 17, or 18.

At 1106, the first wireless device may receive the first reflected sensing signal from the first wireless device via the target object. For example, 1106 may be performed by the wireless node 702 in FIG. 7, which may receive the set of $1^{st}$ order reflected sensing signals 722 from the wireless node 702 via the target object 705. Moreover, 1106 may be performed by the component 198 in FIG. 1, 3, 16, 17, or 18.

At 1108, the first wireless device may receive the second reflected sensing signal from the reflective object via the target object. For example, 1108 may be performed by the wireless node 702 in FIG. 7, which may receive the set of $2^{nd}$ order reflected sensing signals 718 from the RIS 704 via the target object 705. Moreover, 1108 may be performed by the component 198 in FIG. 1, 3, 16, 17, or 18.

At 1110, the first wireless device may calculate a location of the target object based on the first reflected sensing signal, the second reflected sensing signal, and the sensing signal configuration. For example, 1110 may be performed by the wireless node 702 in FIG. 7, which may calculate a location of the target object 705 based on the set of $1^{st}$ order reflected sensing signals 722, the set of $2^{nd}$ order reflected sensing signals 718, and the sensing signal configuration 712. Moreover, 1110 may be performed by the component 198 in FIG. 1, 3, 16, 17, or 18.

At 1112, the first wireless device may transmit the sensing signal configuration to a second wireless device. For example, 1112 may be performed by the wireless node 602 in FIG. 6, which may transmit the sensing signal configuration 612 to the RIS 604, which may be a wireless device that may use the sensing signal configuration 612 to reflect the set of sensing signals 614. Moreover, 1112 may be performed by the component 198 in FIG. 1, 3, 16, 17, or 18.

At 1114, the first wireless device may receive a path report from the second wireless device based on a first indication of a type of reflector associated with the reflective object and a second indication of a position associated with the reflective object. The sensing signal configuration may include the first indication and the second indication. For example, 1114 may be performed by the wireless node 602 in FIG. 6, which may receive a path report as the sensing report 626 from the wireless node 606 based on a first indication of a type of reflector associated with the RIS 604 (e.g., an indication that the reflector is the RIS 604) and a second indication of a position associated with the RIS 604. The sensing signal configuration 610 may include the first indication and the second indication as a configuration of the path report. Moreover, 1114 may be performed by the component 198 in FIG. 1, 3, 16, 17, or 18.

At 1116, the first wireless device may transmit an indication of a scatter direction to the RIS. The sensing signal configuration may include the indication of the scatter direction. For example, 1116 may be performed by the wireless node 602 in FIG. 6, which may transmit an indication of a scatter direction for the set of sensing signals 614 to the RIS 604 as the sensing signal configuration 612. The sensing signal configuration 612 may include the indication of the scatter direction. Moreover, 1116 may be performed by the component 198 in FIG. 1, 3, 16, 17, or 18.

At 1118, the first wireless device may receive a sensing request to perform sensing within a designated range. For example, 1118 may be performed by the wireless node 602 in FIG. 6, which may receive a sensing request from a sensing entity (e.g., a network node of a core network, or an LMF) to perform sensing within a designated range about the target object 605 (e.g., a geofenced area, an area of interest about a target object). Moreover, 1118 may be performed by the component 198 in FIG. 1, 3, 16, 17, or 18.

At 1120, the first wireless device may identify a set of reflective objects that have a LOS path to the designated range with respect to the first wireless device. For example, 1120 may be performed by the wireless node 602 in FIG. 6, which may identify a set of reflective objects that have a LOS path to the designated range with respect to the wireless node 602. For example, the wireless node 602 may identify a set of reflective objects that have a LOS path to an area about the target object 605, and may select the RIS 604 from the set of reflective objects for use in sensing. Moreover, 1120 may be performed by the component 198 in FIG. 1, 3, 16, 17, or 18.

At 1122, the first wireless device may transmit the set of sensing signals to the reflective object based on identifying the set of reflective objects including the reflective object. For example, 1122 may be performed by the wireless node 602 in FIG. 6, which may transmit the set of sensing signals 614 to the RIS 604 based on identifying the set of reflective objects including the RIS 604. Moreover, 1122 may be performed by the component 198 in FIG. 1, 3, 16, 17, or 18.

Figure 12:
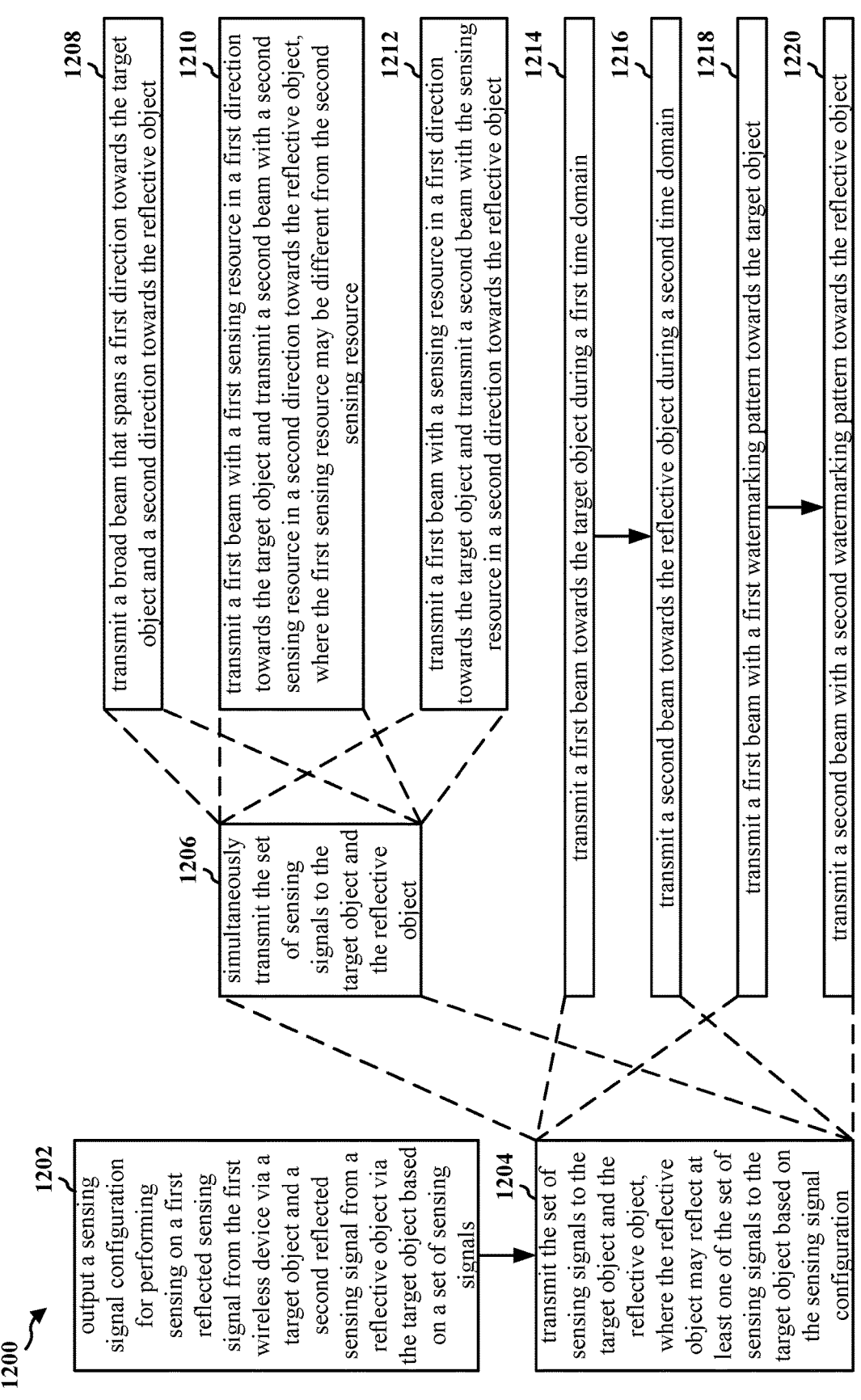
FIG. 12 is a flowchart of a method of wireless communication.

FIG. 12 is a flowchart 1200 of a method of wireless communication. The method may be performed by a first wireless device (e.g., the UE 104, the UE 350; the wireless node 402, the wireless node 406, the wireless node 408, the wireless node 502, the wireless node 602, the wireless node 702, the wireless node 802, the wireless node 902; the base station 102, the base station 310; the apparatus 1604; the network entity 1602, the network entity 1702, the network entity 1860). At 1202, the first wireless device may output a sensing signal configuration for performing sensing on a first reflected sensing signal from the first wireless device via a target object and a second reflected sensing signal from a reflective object via the target object based on a set of sensing signals. For example, 1202 may be performed by the wireless node 602 in FIG. 6, which may output the sensing signal configuration 610 for performing sensing on the set of 1$^{st}$ order reflected sensing signals 622 from the wireless node 602 via the target object 605 and the set of 2$^{nd}$ order reflected sensing signals 618 from the RIS 604 via the target object 605 based on the set of sensing signals which include the set of sensing signals 614 and the set of sensing signals 620. 1202 may be performed by the wireless node 702 in FIG. 7, which may output a sensing signal configuration configured at 708 for performing sensing on the set of 1$^{st}$ order reflected sensing signals 722 from the wireless node 702 via the target object 705 and the set of 2$^{nd}$ order reflected sensing signals 718 from the RIS 704 via the target object 705 based on the set of sensing signals which include the set of sensing signals 714 and the set of sensing signals 720. Moreover, 1202 may be performed by the component 198 in FIG. 1, 3, 16, 17, or 18.

At 1204, the first wireless device may transmit the set of sensing signals to the target object and the reflective object. The reflective object may reflect at least one of the set of sensing signals to the target object based on the sensing signal configuration. For example, 1204 may be performed by the wireless node 602 in FIG. 6, which may transmit the set of sensing signals 620 to the target object 605 and may transmit the set of sensing signals 614 to the RIS 604. The RIS 604 may reflect the set of sensing signals 614 to the target object 605 based on the sensing signal configuration 610. Moreover, 1204 may be performed by the component 198 in FIG. 1, 3, 16, 17, or 18.

At 1206, the first wireless device may simultaneously transmit the set of sensing signals to the target object and the reflective object. For example, 1206 may be performed by the wireless node 602 in FIG. 6, which may simultaneously transmit the set of sensing signals 614 and the set of sensing signals 620 to the target object 605 and the RIS 604. Moreover, 1206 may be performed by the component 198 in FIG. 1, 3, 16, 17, or 18.

At 1208, the first wireless device may transmit a broad beam that spans a first direction towards the target object and a second direction towards the reflective object. For example, 1208 may be performed by the wireless node 602 in FIG. 6, which may transmit a broad beam that spans a first direction towards the target object 605 and a second direction towards the RIS 604. The broad beam may include the set of sensing signals 614 and the set of sensing signals 620. The set of sensing signals 614 and the set of sensing signals 620 may be the same set of sensing signals. The RIS 604 may introduce a watermark to the set of 1$^{st}$ order reflected sensing signals 616 to differentiate the set of 2$^{nd}$ order reflected sensing signals 618 from the set of 1$^{st}$ order reflected sensing signals 622. Moreover, 1208 may be performed by the component 198 in FIG. 1, 3, 16, 17, or 18.

At 1210, the first wireless device may transmit a first beam with a first sensing resource in a first direction towards the target object and transmit a second beam with a second sensing resource in a second direction towards the reflective object. The first sensing resource may be different from the second sensing resource. For example, 1210 may be performed by the wireless node 602 in FIG. 6, which may transmit a first beam of the set of sensing signals 620 with a first sensing resource in a first direction towards the target object 605 and transmit a second beam of the set of sensing signals 614 with a second sensing resource in a second direction towards the RIS 604. The first sensing resource may be different from the second sensing resource. Moreover, 1210 may be performed by the component 198 in FIG. 1, 3, 16, 17, or 18.

At 1212, the first wireless device may transmit a first beam with a sensing resource in a first direction towards the target object and transmit a second beam with the sensing resource in a second direction towards the target object. For example, 1212 may be performed by the wireless node 602 in FIG. 6, which may transmit a first beam of the set of sensing signals 620 with a sensing resource in a first direction towards the target object 605 and transmit a second beam with the same sensing resource in a second direction towards the RIS 604. Moreover, 1212 may be performed by the component 198 in FIG. 1, 3, 16, 17, or 18.

At 1214, the first wireless device may transmit a first beam towards the target object during a first time domain. For example, 1214 may be performed by the wireless node 602 in FIG. 6, which may transmit a first beam towards the target object 605 during a first time domain using TDM. Moreover, 1214 may be performed by the component 198 in FIG. 1, 3, 16, 17, or 18.

At 1216, the first wireless device may transmit a second beam towards the reflective object during a second time domain. For example, 1216 may be performed by the wireless node 602 in FIG. 6, which may transmit a second beam towards the RIS 604 during a second time domain using TDM. Moreover, 1216 may be performed by the component 198 in FIG. 1, 3, 16, 17, or 18.

At 1218, the first wireless device may transmit a first beam with a first watermarking pattern towards the target object. For example, 1218 may be performed by the wireless node 602 in FIG. 6, which may transmit a first beam with a first watermarking pattern towards the target object 605. Moreover, 1218 may be performed by the component 198 in FIG. 1, 3, 16, 17, or 18.

At 1220, the first wireless device may transmit a second beam with a second watermarking pattern towards the reflective object. For example, 1220 may be performed by the wireless node 602 in FIG. 6, which may transmit a second beam with a second watermarking pattern towards the RIS 604. Moreover, 1220 may be performed by the component 198 in FIG. 1, 3, 16, 17, or 18.

FIG. 13 is a flowchart 1300 of a method of wireless communication. The method may be performed by a second wireless device (e.g., the UE 104, the UE 350; the wireless node 402, the wireless node 404, the wireless node 506, the wireless node 606, the wireless node 702, the wireless node 806, the wireless node 902; the base station 102, the base station 310; the apparatus 1604; the network entity 1602, the network entity 1702, the network entity 1860). At 1302, the second wireless device may receive a sensing signal configuration for performing sensing based on a set of sensing signals from a first wireless device. For example, 1302 may be performed by the wireless node 606 in FIG. 6, which may receive the sensing signal configuration 610 for performing sensing based on the set of sensing signals including the set of sensing signals 614 and the set of sensing signals 620 from the wireless node 602. Moreover, 1302 may be performed by the component 199 in FIG. 1, 3, 16, 17, or 18.

At 1304, the second wireless device may receive a first reflected sensing signal from the first wireless device via a target object. For example, 1304 may be performed by the wireless node 606 in FIG. 6, which may receive the set of 1$^{st}$ order reflected sensing signals 622 from the wireless node 602 via the target object 605. Moreover, 1304 may be performed by the component 199 in FIG. 1, 3, 16, 17, or 18.

At 1306, the second wireless device may receive a second reflected sensing signal from a reflective object via the target object. For example, 1306 may be performed by the wireless node 606 in FIG. 6, which may receive the set of 2$^{nd}$ order reflected sensing signals 618 from the RIS 604 via the target object 605. Moreover, 1306 may be performed by the component 199 in FIG. 1, 3, 16, 17, or 18.

At 1308, the second wireless device may calculate a location of the target object based on the first reflected sensing signal, the second reflected sensing signal, and the sensing signal configuration. For example, 1308 may be performed by the wireless node 606 in FIG. 6, which may, at 624, calculate a location of the target object 605 based on the set of 1$^{st}$ order reflected sensing signals 622, the set of 2$^{nd}$ order reflected sensing signals 618, and the sensing signal configuration 610. Moreover, 1308 may be performed by the component 199 in FIG. 1, 3, 16, 17, or 18.

FIG. 14 is a flowchart 1400 of a method of wireless communication. The method may be performed by a second wireless device (e.g., the UE 104, the UE 350; the wireless node 402, the wireless node 404, the wireless node 506, the wireless node 606, the wireless node 702, the wireless node 806, the wireless node 902; the base station 102, the base station 310; the apparatus 1604; the network entity 1602, the network entity 1702, the network entity 1860). At 1402, the second wireless device may receive a sensing signal configuration for performing sensing based on a set of sensing signals from a first wireless device. For example, 1402 may be performed by the wireless node 606 in FIG. 6, which may receive the sensing signal configuration 610 for performing sensing based on the set of sensing signals including the set of sensing signals 614 and the set of sensing signals 620 from the wireless node 602. Moreover, 1302 may be performed by the component 199 in FIG. 1, 3, 16, 17, or 18.

At 1404, the second wireless device may receive a first reflected sensing signal from the first wireless device via a target object. For example, 1404 may be performed by the wireless node 606 in FIG. 6, which may receive the set of 1$^{st}$ order reflected sensing signals 622 from the wireless node 602 via the target object 605. Moreover, 1404 may be performed by the component 199 in FIG. 1, 3, 16, 17, or 18.

At 1406, the second wireless device may receive a second reflected sensing signal from a reflective object via the target object. For example, 1406 may be performed by the wireless node 606 in FIG. 6, which may receive the set of 2$^{nd}$ order reflected sensing signals 618 from the RIS 604 via the target object 605. Moreover, 1406 may be performed by the component 199 in FIG. 1, 3, 16, 17, or 18.

At 1408, the second wireless device may calculate a location of the target object based on the first reflected sensing signal, the second reflected sensing signal, and the sensing signal configuration. For example, 1408 may be performed by the wireless node 606 in FIG. 6, which may, at 624, calculate a location of the target object 605 based on the set of 1$^{st}$ order reflected sensing signals 622, the set of 2$^{nd}$ order reflected sensing signals 618, and the sensing signal configuration 610. Moreover, 1408 may be performed by the component 199 in FIG. 1, 3, 16, 17, or 18.

At 1410, the second wireless device may transmit the path report to the first wireless device. The path report may include a representative path from the target object based on the setting. For example, 1410 may be performed by the wireless node 606 in FIG. 6, which may transmit the path report as the sensing report 626 to the wireless node 602. The sensing report 626 may include a representative path from the target object 605 based on the setting, such as first reflection path including the set of sensing signals 620 and the set of 1$^{st}$ order reflected sensing signals 622 and the second reflection path including the set of sensing signals 614, the set of 1$^{st}$ order reflected sensing signals 616, and the set of 2$^{nd}$ order reflected sensing signals 618. Moreover, 1410 may be performed by the component 199 in FIG. 1, 3, 16, 17, or 18.

At 1412, the second wireless device may receive an indication of a setting associated with a path report from the first wireless device. For example, 1412 may be performed by the wireless node 606 in FIG. 6, which may receive an indication of a setting associated with a path report from the wireless node 602 in the sensing signal configuration 610. Moreover, 1412 may be performed by the component 199 in FIG. 1, 3, 16, 17, or 18.

At 1414, the second wireless device may calculate the location of the target object further based on the indication of the setting. For example, 1414 may be performed by the wireless node 606 in FIG. 6, which may, at 624, calculate the location of the target object 605 further based on the indication of the setting in the sensing signal configuration 610. Moreover, 1414 may be performed by the component 199 in FIG. 1, 3, 16, 17, or 18.

At 1416, the second wireless device may calculate the location of the target object further based on an indication of at least one of a second location or a coverage of a RIS or a VTRP. The reflective object may include at least one of a RIS or a VTRP. The sensing signal configuration may include the indication of at least one of the second location or the coverage of the RIS or the VTRP. For example, 1416 may be performed by the wireless node 606 in FIG. 6, which may calculate the location of the target object 605 further based on an indication of at least one of a location of the wireless node 602, a location of the RIS 604, and/or the coverage of the RIS 604 with respect to the set of sensing signals 614. The RIS 604 may include a RIS. The sensing signal configuration 610 may include the indication of at least one of a location of the wireless node 602, a location of the RIS 604, and/or the coverage of the RIS 604 with respect to the set of sensing signals 614. 1416 may be performed by the wireless node 806 in FIG. 8, which may calculate the location of the target object 805 further based on an indication of at least one of a location of the wireless node 802, a location of the reflector 804, and/or the coverage of the reflector 804 with respect to the set of sensing signals 814. The reflector 804 may include a reflector. The sensing signal configuration 810 may include the indication of at least one of a location of the wireless node 802, a location of the reflector 804, and/or the coverage of the reflector 804 with respect to the set of sensing signals 814. Moreover, 1416 may be performed by the component 199 in FIG. 1, 3, 16, 17, or 18.

At 1418, the second wireless device may calculate the location of the target object further based on a first indication of a type of reflector associated with the reflective object and a second indication of a position associated with the reflective object. The sensing signal configuration may include the first indication and the second indication. For example, 1418 may be performed by the wireless node 606 in FIG. 6, which may, at 624, calculate the location of the target object 605 further based on a first indication of a type of reflector associated with the RIS 604 and a second indication of a position associated with the RIS 604. The sensing signal configuration 610 may include the first indication and the second indication. Moreover, 1418 may be performed by the component 199 in FIG. 1, 3, 16, 17, or 18.

At 1420, the second wireless device may calculate the location of the target object further based on a first indication of a first sensing resource associated with a first subset of the set of sensing signals and a second indication of a second sensing resource associated with a second subset of the set of sensing signals. The sensing signal configuration may include the first indication and the second indication. The first reflected sensing signal may be associated with the first sensing resource. The second reflected sensing signal may be associated with the second sensing resource. For example, 1420 may be performed by the wireless node 606 in FIG. 6, which, at 624, may calculate the location of the target object 605 further based on a first indication of a first sensing resource associated with the set of sensing signals 614 and a second indication of a second sensing resource associated with the set of sensing signals 620. The sensing signal configuration 610 may include the first indication and the second indication. The set of $2^{nd}$ order reflected sensing signals 618 may be associated with the first sensing resource. The set of $1^{st}$ order reflected sensing signals 622 may be associated with the second sensing resource. Moreover, 1420 may be performed by the component 199 in FIG. 1, 3, 16, 17, or 18.

FIG. 15 is a flowchart 1500 of a method of wireless communication. The method may be performed by a second wireless device (e.g., the UE 104, the UE 350; the wireless node 402, the wireless node 404, the wireless node 506, the wireless node 606, the wireless node 702, the wireless node 806, the wireless node 902; the base station 102, the base station 310; the apparatus 1604; the network entity 1602, the network entity 1702, the network entity 1860). At 1502, the second wireless device may receive a sensing signal configuration for performing sensing based on a set of sensing signals from a first wireless device. For example, 1502 may be performed by the wireless node 606 in FIG. 6, which may receive the sensing signal configuration 610 for performing sensing based on the set of sensing signals including the set of sensing signals 614 and the set of sensing signals 620 from the wireless node 602. Moreover, 1302 may be performed by the component 199 in FIG. 1, 3, 16, 17, or 18.

At 1504, the second wireless device may receive a first reflected sensing signal from the first wireless device via a target object. For example, 1504 may be performed by the wireless node 606 in FIG. 6, which may receive the set of $1^{st}$ order reflected sensing signals 622 from the wireless node 602 via the target object 605. Moreover, 1504 may be performed by the component 199 in FIG. 1, 3, 16, 17, or 18.

At 1506, the second wireless device may receive a second reflected sensing signal from a reflective object via the target object. For example, 1506 may be performed by the wireless node 606 in FIG. 6, which may receive the set of $2^{nd}$ order reflected sensing signals 618 from the RIS 604 via the target object 605. Moreover, 1506 may be performed by the component 199 in FIG. 1, 3, 16, 17, or 18.

At 1508, the second wireless device may calculate a location of the target object based on the first reflected sensing signal, the second reflected sensing signal, and the sensing signal configuration. For example, 1508 may be performed by the wireless node 606 in FIG. 6, which may, at 624, calculate a location of the target object 605 based on the set of $1^{st}$ order reflected sensing signals 622, the set of $2^{nd}$ order reflected sensing signals 618, and the sensing signal configuration 610. Moreover, 1508 may be performed by the component 199 in FIG. 1, 3, 16, 17, or 18.

At 1510, the second wireless device may calculate the location of the target object further based on a first indication of a first time domain associated with a first subset of the set of sensing signals and a second indication of a second time domain associated with a second subset of the set of sensing signals. The sensing signal configuration may include the first indication and the second indication. The first reflected sensing signal may be associated with the first time domain. The second reflected sensing signal may be associated with the second time domain. For example, 1510 may be performed by the wireless node 606 in FIG. 6, which, at 624, may calculate the location of the target object 605 further based on a first indication of a first time domain associated with the set of sensing signals 614 (and hence the set of $2^{nd}$ order sensing signals 618) and a second indication of a second time domain associated with the set of sensing signals 620 (and hence the set of $1^{st}$ order sensing signals 622). The sensing signal configuration 610 may include the first indication and the second indication. The set of $2^{nd}$ order sensing signals 618 may be associated with the first time domain. The set of $1^{st}$ order sensing signals 622 may be associated with the second time domain. Moreover, 1510 may be performed by the component 199 in FIG. 1, 3, 16, 17, or 18.

At 1512, the second wireless device may calculate the location of the target object further based on a first indication of a first watermarking pattern associated with a first subset of the set of sensing signals and a second indication of a second watermarking pattern associated with a second subset of the set of sensing signals. The sensing signal configuration may include the first indication and the second indication. The first reflected sensing signal may include the first watermarking pattern. The second reflected sensing signal may include the second watermarking pattern. For example, 1512 may be performed by the wireless node 606 in FIG. 6, which, at 624, may calculate the location of the target object 605 further based on a first indication of a first watermarking pattern associated with the set of $2^{nd}$ order sensing signals 618 and a second indication of a second watermarking pattern associated with the set of $1^{st}$ order sensing signals 622. The sensing signal configuration 610 may include the first indication and the second indication. The set of $2^{nd}$ order sensing signals 618 may include the first watermarking pattern. The set of $1^{st}$ order sensing signals 622 may include the second watermarking pattern. Moreover, 1512 may be performed by the component 199 in FIG. 1, 3, 16, 17, or 18.

In some aspects, the second wireless device may calculate the location of the target object further based on an indication of a watermarking pattern associated with a subset of the set of sensing signals. The sensing signal configuration may include the indication. The first or second reflected sensing signal may include the first watermarking pattern. For example, 1512 may be performed by the wireless node 606 in FIG. 6, which, at 624, may calculate the location of the target object 605 further based on an indication of a watermarking pattern associated with the set of $2^{nd}$ order sensing signals 618. The sensing signal configuration 610 may include the indication. The set of $2^{nd}$ order sensing signals 618 may include the watermarking pattern introduced by the RIS 604. Moreover, this calculation may be performed by the component 199 in FIG. 1, 3, 16, 17, or 18.

Figure 16:
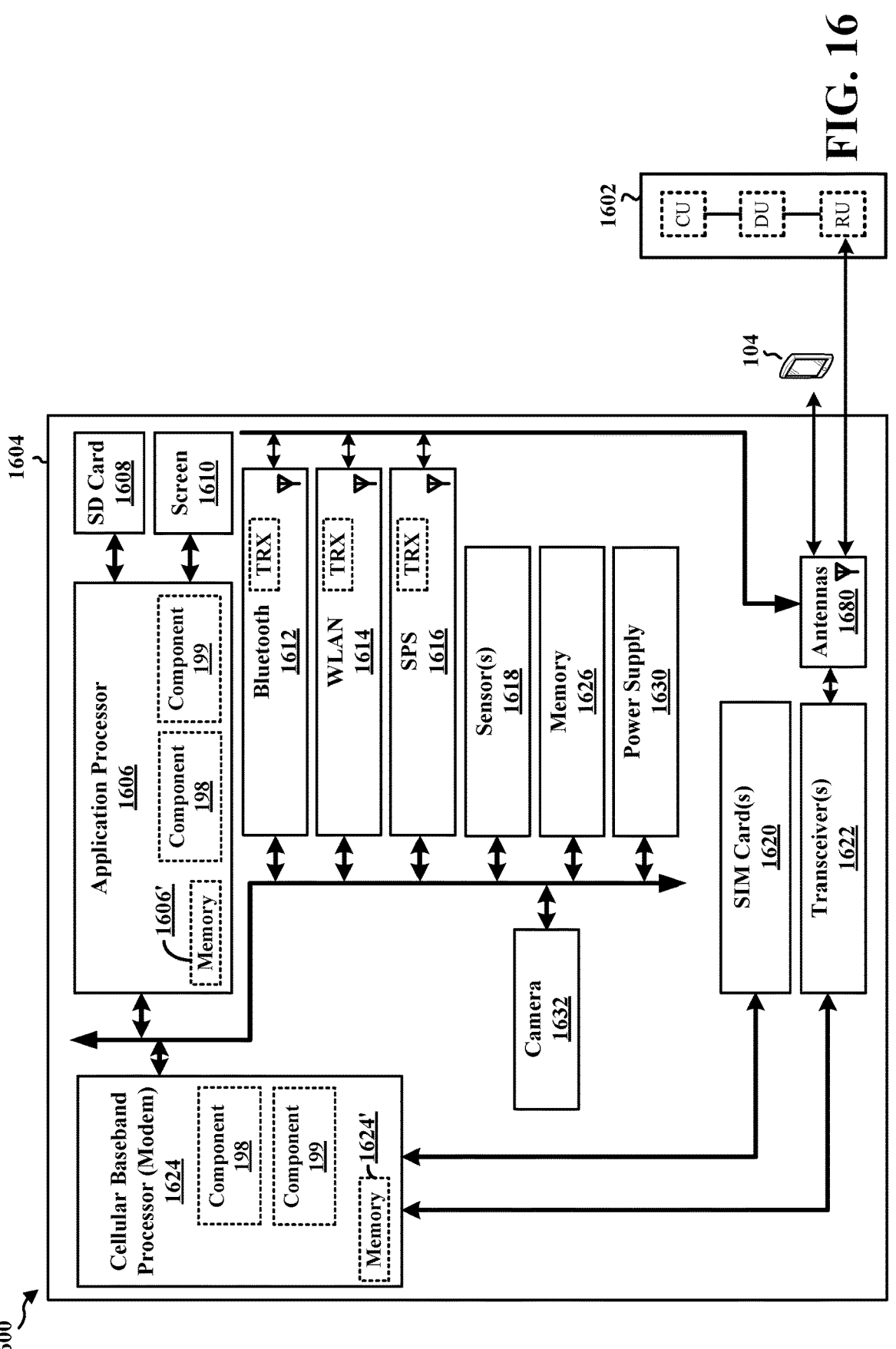
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 904 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (Rx)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the Tx processor 368, the Rx processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 350 of FIG. 3) and include the additional modules of the apparatus 1604.

As discussed supra, the component 198 may be configured to output a sensing signal configuration for performing sensing on a first reflected sensing signal from a first wireless device (e.g., the apparatus 1604) via a target object and a second reflected sensing signal from a reflective object via the target object based on a set of sensing signals. The component 198 may be configured to transmit the set of sensing signals to the target object and the reflective object. The reflective object may reflect at least one of the set of sensing signals to the target object based on the sensing signal configuration. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for outputting a sensing signal configuration for performing sensing on a first reflected sensing signal from the first wireless device via a target object and a second reflected sensing signal from a reflective object via the target object based on a set of sensing signals. The apparatus 1604 may include means for transmitting the set of sensing signals to the target object and the reflective object. The reflective object may reflect at least one of the set of sensing signals to the target object based on the sensing signal configuration. The reflective object may include at least one of a RIS or a VTRP. The sensing signal configuration may include an indication of at least one of a location or a coverage of the RIS or the VTRP. The reflective object may include a RIS. The apparatus 1604 may include means for transmitting an indication of a scatter direction to the RIS. The sensing signal configuration may include the indication of the scatter direction. The apparatus 1604 may include means for receiving a sensing request to perform sensing within a designated range. The apparatus 1604 may include means for identifying a set of reflective objects that have a LOS path to the designated range with respect to the first wireless device. The set of reflective objects may include the reflective object. The apparatus 1604 may include means for transmitting the set of sensing signals to the reflective object based on the identification of the set of reflective objects including the reflective object. The designated range may include at least one of a position of the target object or an area of interest including the position of the target object. The apparatus 1604 may include means for outputting the sensing signal configuration by transmitting the sensing signal configuration to a second wireless device. The sensing signal configuration may include an indication of a set of narrow transmit beams associated with the set of sensing signals. Each of the set of narrow transmit beams may include a discrete resource or a discrete direction. The apparatus 1604 may include means for transmitting the sensing signal configuration by transmitting at least one of DCI, an RRC message, or a MAC-CE including the sensing signal configuration to the second wireless device. The apparatus 1604 may include means for transmitting the sensing signal configuration by broadcasting a system information message including the sensing signal configuration. The first wireless device may include at least one of a first UE or a first network node. The second wireless device may include at least one of a second UE or a second network node. The sensing signal configuration may include an indication of a path report. The sensing signal configuration may include a first indication of a type of reflector associated with the reflective object and a second indication of a position associated with the reflective object. The apparatus 1604 may include means for transmitting an indication of a setting associated with a path report to a second wireless device. The setting may include at least one of a clustering method, a delay threshold, an AoA threshold, a number of representative paths, or a metric for representative path selection. The apparatus 1604 may include means for receiving a path report from the second wireless device based on the indication of the setting. The apparatus 1604 may include means for transmitting the set of sensing signals to the target object and the reflective object by simultaneously transmitting the set of sensing signals to the target object and the reflective object. The apparatus 1604 may include means for simultaneously transmitting the set of sensing signals to the target object and the reflective object by transmitting a broad beam that spans a first direction towards the target object and a second direction towards the reflective object. The apparatus 1604 may include means for simultaneously transmitting the set of sensing signals to the target object and the reflective object by transmitting a first beam with a first sensing resource in a first direction towards the target object and transmitting a second beam with a second sensing resource in a second direction towards the reflective object. The first sensing resource may be different from the second sensing resource. The apparatus 1604 may include means for simultaneously transmitting the set of sensing signals to the target object and the reflective object by transmitting a first beam with a sensing resource in a first direction towards the target object and transmitting a second beam with the sensing resource in a second direction towards the reflective object. The apparatus 1604 may include means for transmitting the set of sensing signals to the target object and the reflective object by transmitting a first beam towards the target object during a first time domain and transmitting a second beam towards the reflective object during a second time domain. The apparatus 1604 may include means for transmitting the set of sensing signals to the target object and the reflective object by transmitting a first beam with a first watermarking pattern towards the target object and transmitting a second beam with a second watermarking pattern towards the reflective object. The apparatus 1604 may include means for receiving the first reflected sensing signal from the first wireless device via the target object. The apparatus 1604 may include means for receiving the second reflected sensing signal from the reflective object via the target object. The apparatus 1604 may include means for calculating a location of the target object based on the first reflected sensing signal, the second reflected sensing signal, and the sensing signal configuration. The means may be the component 198 of the apparatus 1604 configured to perform the functions recited by the means. As described supra, the apparatus 1604 may include the Tx processor 368, the Rx processor 356, and the controller/processor 359. As such, in one configuration, the means may be the Tx processor 368, the Rx processor 356, and/or the controller/processor 359 configured to perform the functions recited by the means.

As discussed supra, the component 199 may be configured to receive a sensing signal configuration for performing sensing based on a set of sensing signals from a second wireless device (e.g., the apparatus 1604). The component 199 may be configured to receive a first reflected sensing signal from the first wireless device via a target object. The component 199 may be configured to receive a second reflected sensing signal from a reflective object via the target object. The component 199 may be configured to calculate a location of the target object based on the first reflected sensing signal, the second reflected sensing signal, and the sensing signal configuration. The component 199 may be within the cellular baseband processor 1624, the application processor 1606, or both the cellular baseband processor 1624 and the application processor 1606. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for receiving a sensing signal configuration for performing sensing based on a set of sensing signals from a first wireless device. The apparatus 1604 may include means for receiving a first reflected sensing signal from the first wireless device via a target object. The apparatus 1604 may include means for receiving a second reflected sensing signal from a reflective object via the target object. The apparatus 1604 may include means for calculating a location of the target object based on the first reflected sensing signal, the second reflected sensing signal, and the sensing signal configuration. The reflective object may include at least one of a RIS or a VTRP. The sensing signal configuration may include an indication of at least one of a second location or a coverage of the RIS or the VTRP. The apparatus 1604 may include means for calculating the location of the target object based on the indication of at least one of the second location or the coverage of the RIS or the VTRP. The sensing signal configuration may include an indication of a set of narrow transmit beams associated with the set of sensing signals. Each of the set of narrow transmit beams may include a discrete resource or a discrete direction. The apparatus 1604 may include means for receiving the sensing signal configuration by receiving at least one of DCI, an RRC message, or a MAC-CE including the sensing signal configuration from the first wireless device. The apparatus 1604 may include means for receiving the sensing signal configuration by receiving a broadcast system information message including the sensing signal configuration. The first wireless device may include at least one of a first UE or a first network node. The second wireless device may include at least one of a second UE or a second network node. The sensing signal configuration may include a first indication of a type of reflector associated with the reflective object and a second indication of a position associated with the reflective object. The apparatus 1604 may include means for calculating the location of the target object further based on the first indication and the second indication. The apparatus 1604 may include means for receiving an indication of a setting associated with a path report from the first wireless device. The apparatus 1604 may include means for calculating the location of the target object further based on the indication of the setting. The setting may include at least one of a clustering method, a delay threshold, an AoA threshold, a number of representative paths, or a metric for representative path selection. The apparatus 1604 may include means for transmitting the path report to the first wireless device. The path report may include a representative path from the target object based on the sensing signal configuration. The sensing signal configuration may include a first indication of a first sensing resource associated with a first subset of the set of sensing signals and a second indication of a second sensing resource associated with a second subset of the set of sensing signals. The first reflected sensing signal may be associated with the first sensing resource. The second reflected sensing signal may be associated with the second sensing resource. The apparatus 1604 may include means for calculating the location of the target object further based on the first indication of the first sensing resource and the second indication of the second sensing resource. The sensing signal configuration may include a first indication of a first time domain associated with a first subset of the set of sensing signals and a second indication of a second time domain associated with a second subset of the set of sensing signals. The first reflected sensing signal may be associated with the first time domain. The second reflected sensing signal may be associated with the second time domain. The apparatus 1604 may include means for calculating the location of the target object further based on the first indication of the first time domain and the second indication of the second time domain. The sensing signal configuration may include a first indication of a first watermarking pattern associated with a first subset of the set of sensing signals and a second indication of a second watermarking pattern associated with a second subset of the set of sensing signals. The first reflected sensing signal may include the first watermarking pattern. The second reflected sensing signal may include the second watermarking pattern. The apparatus 1604 may include means for calculating the location of the target object further based on the first indication of the first watermarking pattern and the second indication of the second watermarking pattern. The means may be the component 199 of the apparatus 1604 configured to perform the functions recited by the means. As described supra, the apparatus 1604 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 17:
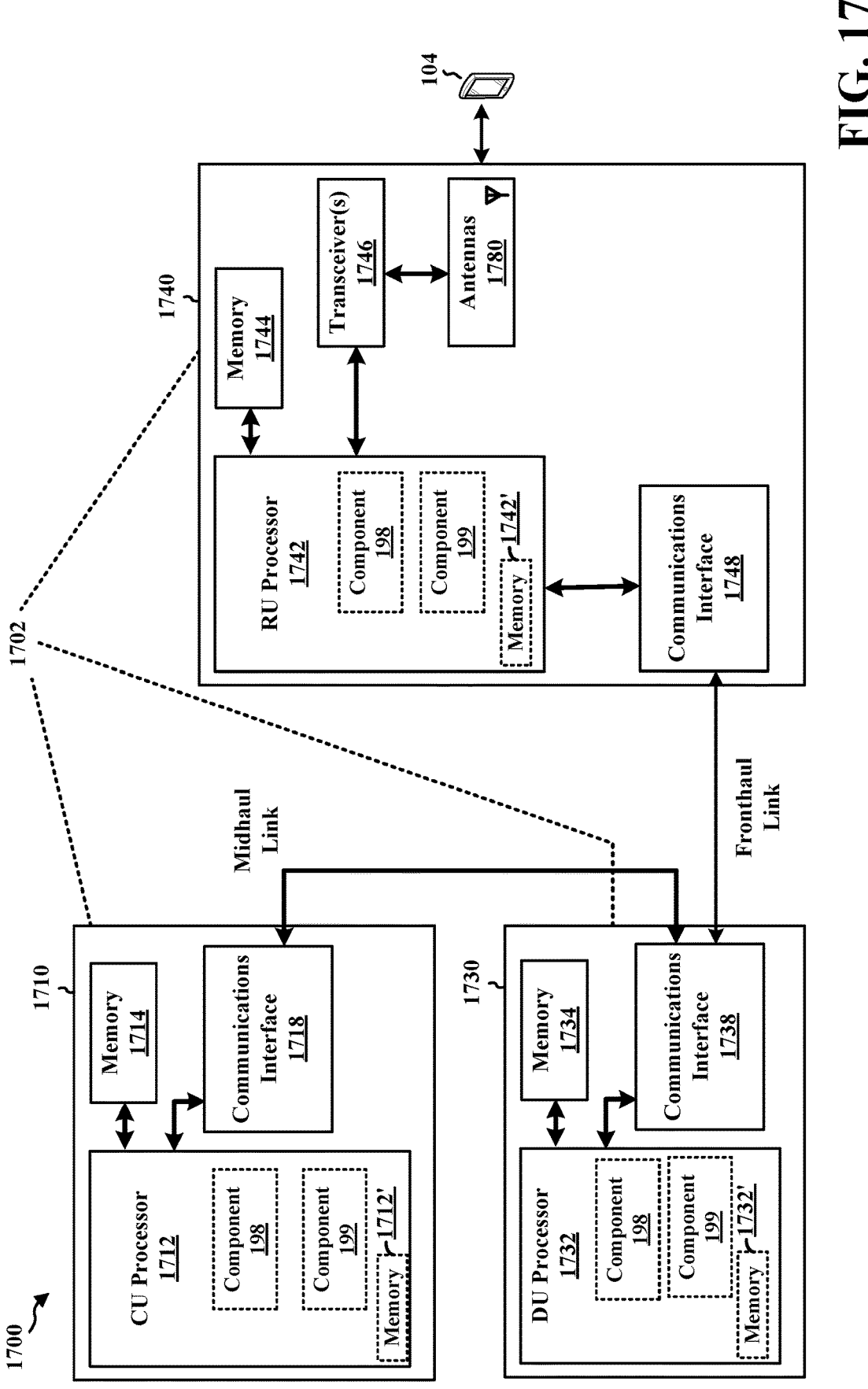
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to output a sensing signal configuration for performing sensing on a first reflected sensing signal from a first wireless device (e.g., the network entity 1702) via a target object and a second reflected sensing signal from a reflective object via the target object based on a set of sensing signals. The component 198 may be configured to transmit the set of sensing signals to the target object and the reflective object. The reflective object may reflect at least one of the set of sensing signals to the target object based on the sensing signal configuration. The component 198 may be within one or more processors of one or more of the CU 1710, DU 1730, and the RU 1740. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for outputting a sensing signal configuration for performing sensing on a first reflected sensing signal from the first wireless device via a target object and a second reflected sensing signal from a reflective object via the target object based on a set of sensing signals. The network entity 1702 may include means for transmitting the set of sensing signals to the target object and the reflective object. The reflective object may reflect at least one of the set of sensing signals to the target object based on the sensing signal configuration. The reflective object may include at least one of a RIS or a VTRP. The sensing signal configuration may include an indication of at least one of a location or a coverage of the RIS or the VTRP. The reflective object may include a RIS. The network entity 1702 may include means for transmitting an indication of a scatter direction to the RIS. The sensing signal configuration may include the indication of the scatter direction. The network entity 1702 may include means for receiving a sensing request to perform sensing within a designated range. The network entity 1702 may include means for identifying a set of reflective objects that have a LOS path to the designated range with respect to the first wireless device. The set of reflective objects may include the reflective object. The network entity 1702 may include means for transmitting the set of sensing signals to the reflective object based on the identification of the set of reflective objects including the reflective object. The designated range may include at least one of a position of the target object or an area of interest including the position of the target object. The network entity 1702 may include means for outputting the sensing signal configuration by transmitting the sensing signal configuration to a second wireless device. The sensing signal configuration may include an indication of a set of narrow transmit beams associated with the set of sensing signals. Each of the set of narrow transmit beams may include a discrete resource or a discrete direction. The network entity 1702 may include means for transmitting the sensing signal configuration by transmitting at least one of DCI, an RRC message, or a MAC-CE including the sensing signal configuration to the second wireless device. The network entity 1702 may include means for transmitting the sensing signal configuration by broadcasting a system information message including the sensing signal configuration. The first wireless device may include at least one of a first UE or a first network node. The second wireless device may include at least one of a second UE or a second network node. The sensing signal configuration may include an indication of a path report. The sensing signal configuration may include a first indication of a type of reflector associated with the reflective object and a second indication of a position associated with the reflective object. The network entity 1702 may include means for transmitting an indication of a setting associated with a path report to a second wireless device. The setting may include at least one of a clustering method, a delay threshold, an AoA threshold, a number of representative paths, or a metric for representative path selection. The network entity 1702 may include means for receiving a path report from the second wireless device based on the indication of the setting. The network entity 1702 may include means for transmitting the set of sensing signals to the target object and the reflective object by simultaneously transmitting the set of sensing signals to the target object and the reflective object. The network entity 1702 may include means for simultaneously transmitting the set of sensing signals to the target object and the reflective object by transmitting a broad beam that spans a first direction towards the target object and a second direction towards the reflective object. The network entity 1702 may include means for simultaneously transmitting the set of sensing signals to the target object and the reflective object by transmitting a first beam with a first sensing resource in a first direction towards the target object and transmitting a second beam with a second sensing resource in a second direction towards the reflective object. The first sensing resource may be different from the second sensing resource. The network entity 1702 may include means for simultaneously transmitting the set of sensing signals to the target object and the reflective object may include transmitting a first beam with a sensing resource in a first direction towards the target object and transmitting a second beam with the sensing resource in a second direction towards the reflective object. The network entity 1702 may include means for transmitting the set of sensing signals to the target object and the reflective object by transmitting a first beam towards the target object during a first time domain and transmitting a second beam towards the reflective object during a second time domain. The network entity 1702 may include means for transmitting the set of sensing signals to the target object and the reflective object by transmitting a first beam with a first watermarking pattern towards the target object and transmitting a second beam with a second watermarking pattern towards the reflective object. The network entity 1702 may include means for receiving the first reflected sensing signal from the first wireless device via the target object. The network entity 1702 may include means for receiving the second reflected sensing signal from the reflective object via the target object. The network entity 1702 may include means for calculating a location of the target object based on the first reflected sensing signal, the second reflected sensing signal, and the sensing signal configuration. The means may be the component 198 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

As discussed supra, the component 199 may be configured to receive a sensing signal configuration for performing sensing based on a set of sensing signals from a first wireless device (e.g., the network entity 1702). The component 199 may be configured to receive a first reflected sensing signal from the first wireless device via a target object. The component 199 may be configured to receive a second reflected sensing signal from a reflective object via the target object. The component 199 may be configured to calculate a location of the target object based on the first reflected sensing signal, the second reflected sensing signal, and the sensing signal configuration. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for receiving a sensing signal configuration for performing sensing based on a set of sensing signals from a first wireless device. The network entity 1702 may include means for receiving a first reflected sensing signal from the first wireless device via a target object. The network entity 1702 may include means for receiving a second reflected sensing signal from a reflective object via the target object. The network entity 1702 may include means for calculating a location of the target object based on the first reflected sensing signal, the second reflected sensing signal, and the sensing signal configuration. The reflective object may include at least one of a RIS or a VTRP. The sensing signal configuration may include an indication of at least one of a second location or a coverage of the RIS or the VTRP. The network entity 1702 may include means for calculating the location of the target object based on the indication of at least one of the second location or the coverage of the RIS or the VTRP. The sensing signal configuration may include an indication of a set of narrow transmit beams associated with the set of sensing signals. Each of the set of narrow transmit beams may include a discrete resource or a discrete direction. The network entity 1702 may include means for receiving the sensing signal configuration by receiving at least one of DCI, an RRC message, or a MAC-CE including the sensing signal configuration from the first wireless device. The network entity 1702 may include means for receiving the sensing signal configuration by receiving a broadcast system information message including the sensing signal configuration. The first wireless device may include at least one of a first UE or a first network node. The second wireless device may include at least one of a second UE or a second network node. The sensing signal configuration may include a first indication of a type of reflector associated with the reflective object and a second indication of a position associated with the reflective object. The network entity 1702 may include means for calculating the location of the target object may be further based on the first indication and the second indication. The network entity 1702 may include means for receiving an indication of a setting associated with a path report from the first wireless device. The network entity 1702 may include means for calculating the location of the target object may be further based on the indication of the setting. The setting may include at least one of a clustering method, a delay threshold, an AoA threshold, a number of representative paths, or a metric for representative path selection. The network entity 1702 may include means for transmitting the path report to the first wireless device. The path report may include a representative path from the target object based on the sensing signal configuration. The sensing signal configuration may include a first indication of a first sensing resource associated with a first subset of the set of sensing signals and a second indication of a second sensing resource associated with a second subset of the set of sensing signals. The first reflected sensing signal may be associated with the first sensing resource. The second reflected sensing signal may be associated with the second sensing resource. The network entity 1702 may include means for calculating the location of the target object may be further based on the first indication of the first sensing resource and the second indication of the second sensing resource. The sensing signal configuration may include a first indication of a first time domain associated with a first subset of the set of sensing signals and a second indication of a second time domain associated with a second subset of the set of sensing signals. The first reflected sensing signal may be associated with the first time domain. The second reflected sensing signal may be associated with the second time domain. The network entity 1702 may include means for calculating the location of the target object may be further based on the first indication of the first time domain and the second indication of the second time domain. The sensing signal configuration may include a first indication of a first watermarking pattern associated with a first subset of the set of sensing signals and a second indication of a second watermarking pattern associated with a second subset of the set of sensing signals. The first reflected sensing signal may include the first watermarking pattern. The second reflected sensing signal may include the second watermarking pattern. The network entity 1702 may include means for calculating the location of the target object may be further based on the first indication of the first watermarking pattern and the second indication of the second watermarking pattern. The means may be the component 199 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 18:
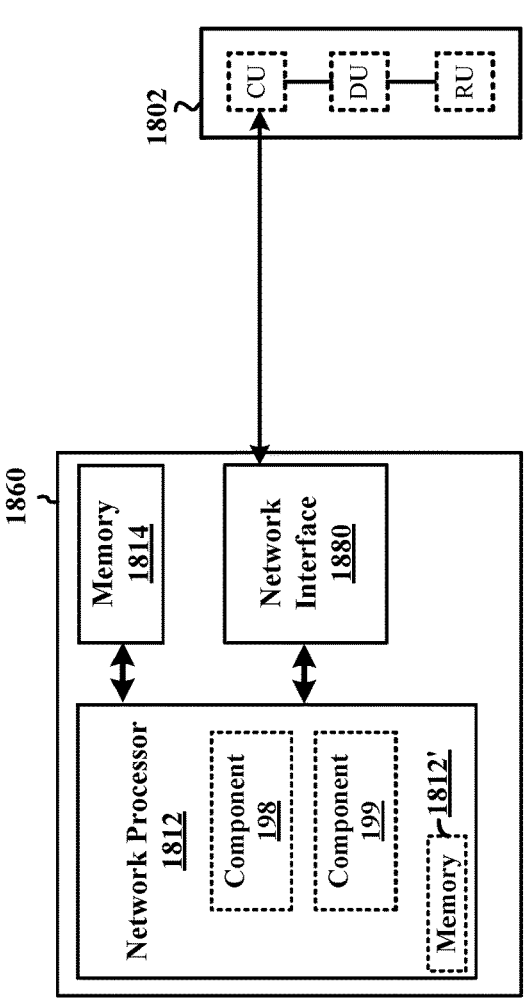
FIG. 18 is a diagram illustrating an example of a hardware implementation for an example network entity.

FIG. 18 is a diagram 1800 illustrating an example of a hardware implementation for a network entity 1860. In one example, the network entity 1860 may be within the core network 120. The network entity 1860 may include a network processor 1812. The network processor 1812 may include on-chip memory 1812'. In some aspects, the network entity 1860 may further include additional memory modules 1814. The network entity 1860 communicates via the network interface 1880 directly (e.g., backhaul link) or indirectly (e.g., through a RIC) with the CU 1802. The on-chip memory 1812' and the additional memory modules 1814 may each be considered a computer-readable medium/memory. Each computer-readable medium/memory may be non-transitory. The processor 1812 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to output a sensing signal configuration for performing sensing on a first reflected sensing signal from a first wireless device (e.g., the network entity 1860) via a target object and a second reflected sensing signal from a reflective object via the target object based on a set of sensing signals. The component 198 may be configured to transmit the set of sensing signals to the target object and the reflective object. The reflective object may reflect at least one of the set of sensing signals to the target object based on the sensing signal configuration. The component 198 may be within the processor 1812. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for outputting a sensing signal configuration for performing sensing on a first reflected sensing signal from the first wireless device via a target object and a second reflected sensing signal from a reflective object via the target object based on a set of sensing signals. The network entity 1860 may include means for transmitting the set of sensing signals to the target object and the reflective object. The reflective object may reflect at least one of the set of sensing signals to the target object based on the sensing signal configuration. The reflective object may include at least one of a RIS or a VTRP. The sensing signal configuration may include an indication of at least one of a location or a coverage of the RIS or the VTRP. The reflective object may include a RIS. The network entity 1860 may include means for transmitting an indication of a scatter direction to the RIS. The sensing signal configuration may include the indication of the scatter direction. The network entity 1860 may include means for receiving a sensing request to perform sensing within a designated range. The network entity 1860 may include means for identifying a set of reflective objects that have a LOS path to the designated range with respect to the first wireless device. The set of reflective objects may include the reflective object. The network entity 1860 may include means for transmitting the set of sensing signals to the reflective object based on the identification of the set of reflective objects including the reflective object. The designated range may include at least one of a position of the target object or an area of interest including the position of the target object. The network entity 1860 may include means for outputting the sensing signal configuration by transmitting the sensing signal configuration to a second wireless device. The sensing signal configuration may include an indication of a set of narrow transmit beams associated with the set of sensing signals. Each of the set of narrow transmit beams may include a discrete resource or a discrete direction. The network entity 1860 may include means for transmitting the sensing signal configuration by transmitting at least one of DCI, an RRC message, or a MAC-CE including the sensing signal configuration to the second wireless device. The network entity 1860 may include means for transmitting the sensing signal configuration by broadcasting a system information message including the sensing signal configuration. The first wireless device may include at least one of a first UE or a first network node. The second wireless device may include at least one of a second UE or a second network node. The sensing signal configuration may include an indication of a path report. The sensing signal configuration may include a first indication of a type of reflector associated with the reflective object and a second indication of a position associated with the reflective object. The network entity 1860 may include means for transmitting an indication of a setting associated with a path report to a second wireless device. The setting may include at least one of a clustering method, a delay threshold, an AoA threshold, a number of representative paths, or a metric for representative path selection. The network entity 1860 may include means for receiving a path report from the second wireless device based on the indication of the setting. The network entity 1860 may include means for transmitting the set of sensing signals to the target object and the reflective object by simultaneously transmitting the set of sensing signals to the target object and the reflective object. The network entity 1860 may include means for simultaneously transmitting the set of sensing signals to the target object and the reflective object by transmitting a broad beam that spans a first direction towards the target object and a second direction towards the reflective object. The network entity 1860 may include means for simultaneously transmitting the set of sensing signals to the target object and the reflective object by transmitting a first beam with a first sensing resource in a first direction towards the target object and transmitting a second beam with a second sensing resource in a second direction towards the reflective object. The first sensing resource may be different from the second sensing resource. The network entity 1860 may include means for simultaneously transmitting the set of sensing signals to the target object and the reflective object may include transmitting a first beam with a sensing resource in a first direction towards the target object and transmitting a second beam with the sensing resource in a second direction towards the reflective object. The network entity 1860 may include means for transmitting the set of sensing signals to the target object and the reflective object by transmitting a first beam towards the target object during a first time domain and transmitting a second beam towards the reflective object during a second time domain. The network entity 1860 may include means for transmitting the set of sensing signals to the target object and the reflective object by transmitting a first beam with a first watermarking pattern towards the target object and transmitting a second beam with a second watermarking pattern towards the reflective object. The network entity 1860 may include means for receiving the first reflected sensing signal from the first wireless device via the target object. The network entity 1860 may include means for receiving the second reflected sensing signal from the reflective object via the target object. The network entity 1860 may include means for calculating a location of the target object based on the first reflected sensing signal, the second reflected sensing signal, and the sensing signal configuration. The means may be the component 198 of the network entity 1860 configured to perform the functions recited by the means.

As discussed supra, the component 199 may be configured to receive a sensing signal configuration for performing sensing based on a set of sensing signals from a first wireless device (e.g., the network entity 1860). The component 199 may be configured to receive a first reflected sensing signal from the first wireless device via a target object. The component 199 may be configured to receive a second reflected sensing signal from a reflective object via the target object. The component 199 may be configured to calculate a location of the target object based on the first reflected sensing signal, the second reflected sensing signal, and the sensing signal configuration. The component 199 may be within the processor 1812. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for receiving a sensing signal configuration for performing sensing based on a set of sensing signals from a first wireless device. The network entity 1860 may include means for receiving a first reflected sensing signal from the first wireless device via a target object. The network entity 1860 may include means for receiving a second reflected sensing signal from a reflective object via the target object. The network entity 1860 may include means for calculating a location of the target object based on the first reflected sensing signal, the second reflected sensing signal, and the sensing signal configuration. The reflective object may include at least one of a RIS or a VTRP. The sensing signal configuration may include an indication of at least one of a second location or a coverage of the RIS or the VTRP. The network entity 1860 may include means for calculating the location of the target object based on the indication of at least one of the second location or the coverage of the RIS or the VTRP. The sensing signal configuration may include an indication of a set of narrow transmit beams associated with the set of sensing signals. Each of the set of narrow transmit beams may include a discrete resource or a discrete direction. The network entity 1860 may include means for receiving the sensing signal configuration by receiving at least one of DCI, an RRC message, or a MAC-CE including the sensing signal configuration from the first wireless device. The network entity 1860 may include means for receiving the sensing signal configuration by receiving a broadcast system information message including the sensing signal configuration. The first wireless device may include at least one of a first UE or a first network node. The second wireless device may include at least one of a second UE or a second network node. The sensing signal configuration may include a first indication of a type of reflector associated with the reflective object and a second indication of a position associated with the reflective object. The network entity 1860 may include means for calculating the location of the target object may be further based on the first indication and the second indication. The network entity 1860 may include means for receiving an indication of a setting associated with a path report from the first wireless device. The network entity 1860 may include means for calculating the location of the target object may be further based on the indication of the setting. The setting may include at least one of a clustering method, a delay threshold, an AoA threshold, a number of representative paths, or a metric for representative path selection. The network entity 1860 may include means for transmitting the path report to the first wireless device. The path report may include a representative path from the target object based on the sensing signal configuration. The sensing signal configuration may include a first indication of a first sensing resource associated with a first subset of the set of sensing signals and a second indication of a second sensing resource associated with a second subset of the set of sensing signals. The first reflected sensing signal may be associated with the first sensing resource. The second reflected sensing signal may be associated with the second sensing resource. The network entity 1860 may include means for calculating the location of the target object may be further based on the first indication of the first sensing resource and the second indication of the second sensing resource. The sensing signal configuration may include a first indication of a first time domain associated with a first subset of the set of sensing signals and a second indication of a second time domain associated with a second subset of the set of sensing signals. The first reflected sensing signal may be associated with the first time domain. The second reflected sensing signal may be associated with the second time domain. The network entity 1860 may include means for calculating the location of the target object may be further based on the first indication of the first time domain and the second indication of the second time domain. The sensing signal configuration may include a first indication of a first watermarking pattern associated with a first subset of the set of sensing signals and a second indication of a second watermarking pattern associated with a second subset of the set of sensing signals. The first reflected sensing signal may include the first watermarking pattern. The second reflected sensing signal may include the second watermarking pattern. The network entity 1860 may include means for calculating the location of the target object may be further based on the first indication of the first watermarking pattern and the second indication of the second watermarking pattern. The means may be the component 199 of the network entity 1860 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, may send the data to a device that transmits the data, or may send the data to a module in the device itself. A device configured to "obtain" data, such as a transmission, signal, or message, may receive, for example with a transceiver, may obtain the data from a device that receives the data, or may obtain the data from a module in the device itself.

The following aspects are illustrative only and may be combined with other aspects or teachings described herein, without limitation.

Aspect 1 is a method of wireless communication at a first wireless device, where the method may include outputting a sensing signal configuration for performing sensing on a first reflected sensing signal from the first wireless device via a target object and a second reflected sensing signal from a reflective object via the target object based on a set of sensing signals. The method may include transmitting the set of sensing signals to the target object and the reflective object. The reflective object may reflect at least one of the set of sensing signals to the target object based on the sensing signal configuration.

Aspect 2 is the method of aspect 1, where the reflective object may include at least one of a RIS or a VTRP. The sensing signal configuration may include an indication of at least one of a location or a coverage of the RIS or the VTRP.

Aspect 3 is the method of either of aspects 1 or 2, where the reflective object may include a RIS. The method may include transmitting an indication of a scatter direction to the RIS. The sensing signal configuration may include the indication of the scatter direction.

Aspect 4 is the method of any of aspects 1 to 3, where the method may include receiving a sensing request to perform sensing within a designated range. The method may include identifying a set of reflective objects that have a LOS path to the designated range with respect to the first wireless device. The set of reflective objects may include the reflective object. Transmitting the set of sensing signals to the reflective object may be based on the identification of the set of reflective objects including the reflective object.

Aspect 5 is the method of aspect 4, where the designated range may include at least one of a position of the target object or an area of interest including the position of the target object.

Aspect 6 is the method of any of aspects 1 to 5, where outputting the sensing signal configuration may include transmitting the sensing signal configuration to a second wireless device.

Aspect 7 is the method of aspect 6, where the sensing signal configuration may include an indication of a set of narrow transmit beams associated with the set of sensing signals.

Aspect 8 is the method of aspect 7, where each of the set of narrow transmit beams may include a discrete resource or a discrete direction.

Aspect 9 is the method of any of aspects 6 to 8, where transmitting the sensing signal configuration may include transmitting at least one of DCI, an RRC message, or a MAC-CE including the sensing signal configuration to the second wireless device.

Aspect 10 is the method of any of aspects 6 to 8, where transmitting the sensing signal configuration may include broadcasting a system information message including the sensing signal configuration.

Aspect 11 is the method of any of aspects 6 to 10, where the first wireless device may include at least one of a first UE or a first network node. The second wireless device may include at least one of a second UE or a second network node.

Aspect 12 is the method of any of aspects 1 to 11, where the sensing signal configuration may include an indication of a path report.

Aspect 13 is the method of any of aspects 1 to 12, where the sensing signal configuration may include a first indication of a type of reflector associated with the reflective object and a second indication of a position associated with the reflective object.

Aspect 14 is the method of any of aspects 1 to 13, where the method may include transmitting an indication of a setting associated with a path report to a second wireless device.

Aspect 15 is the method of aspect 14, where the setting may include at least one of a clustering method, a delay threshold, an AoA threshold, a number of representative paths, or a metric for representative path selection.

Aspect 16 is the method of either of aspects 14 or 15, where the method may include receiving a path report from the second wireless device based on the indication of the setting.

Aspect 17 is the method of any of aspects 1 to 16, where transmitting the set of sensing signals to the target object and the reflective object may include simultaneously transmitting the set of sensing signals to the target object and the reflective object.

Aspect 18 is the method of aspect 17, where simultaneously transmitting the set of sensing signals to the target object and the reflective object may include transmitting a broad beam that spans a first direction towards the target object and a second direction towards the reflective object.

Aspect 19 is the method of aspect 17, where simultaneously transmitting the set of sensing signals to the target object and the reflective object may include transmitting a first beam with a first sensing resource in a first direction towards the target object and transmitting a second beam with a second sensing resource in a second direction towards the reflective object. The first sensing resource may be different from the second sensing resource.

Aspect 20 is the method of either of aspects 17 or 19, where simultaneously transmitting the set of sensing signals to the target object and the reflective object may include transmitting a first beam with a sensing resource in a first direction towards the target object and transmitting a second beam with the sensing resource in a second direction towards the reflective object.

Aspect 21 is the method of any of aspects 1 to 20, where transmitting the set of sensing signals to the target object and the reflective object may include transmitting a first beam towards the target object during a first time domain and transmitting a second beam towards the reflective object during a second time domain.

Aspect 22 is the method of any of aspects 1 to 21, where transmitting the set of sensing signals to the target object and the reflective object may include transmitting a first beam with a first watermarking pattern towards the target object and transmitting a second beam with a second watermarking pattern towards the reflective object.

Aspect 23 is the method of any of aspects 1 to 22, where the method may include receiving the first reflected sensing signal from the first wireless device via the target object. The method may include receiving the second reflected sensing signal from the reflective object via the target object. The method may include calculating a location of the target object based on the first reflected sensing signal, the second reflected sensing signal, and the sensing signal configuration.

Aspect 24 is a method of wireless communication at second wireless device, where the method may include receiving a sensing signal configuration for performing sensing based on a set of sensing signals from a first wireless device. The method may include receiving a first reflected sensing signal from the first wireless device via a target object. The method may include receiving a second reflected sensing signal from a reflective object via the target object. The method may include calculating a location of the target object based on the first reflected sensing signal, the second reflected sensing signal, and the sensing signal configuration.

Aspect 25 is the method of aspect 24, where the reflective object may include at least one of a RIS or a VTRP. The sensing signal configuration may include an indication of at least one of a second location or a coverage of the RIS or the VTRP. Calculating the location of the target object may be further based on the indication of at least one of the second location or the coverage of the RIS or the VTRP.

Aspect 26 is the method of either of aspects 24 or 25, where the sensing signal configuration may include an indication of a set of narrow transmit beams associated with the set of sensing signals.

Aspect 27 is the method of aspect 26, where each of the set of narrow transmit beams may include a discrete resource or a discrete direction.

Aspect 28 is the method of any of aspects 24 to 27, where receiving the sensing signal configuration may include receiving at least one of DCI, an RRC message, or a MAC-CE including the sensing signal configuration from the first wireless device.

Aspect 29 is the method of any of aspects 24 to 27, where receiving the sensing signal configuration may include receiving a broadcast system information message including the sensing signal configuration.

Aspect 30 is the method of any of aspects 24 to 29, where the first wireless device may include at least one of a first UE or a first network node. The second wireless device may include at least one of a second UE or a second network node.

Aspect 31 is the method of any of aspects 24 to 30, where the sensing signal configuration may include a first indication of a type of reflector associated with the reflective object and a second indication of a position associated with the reflective object. Calculating the location of the target object may be further based on the first indication and the second indication.

Aspect 32 is the method of any of aspects 24 to 31, where the method may include receiving an indication of a setting associated with a path report from the first wireless device. Calculating the location of the target object may be further based on the indication of the setting.

Aspect 33 is the method of aspect 32, where the setting may include at least one of a clustering method, a delay threshold, an AoA threshold, a number of representative paths, or a metric for representative path selection.

Aspect 34 is the method of either of aspects 32 or 33, where the method may include transmitting the path report to the first wireless device. The path report may include a representative path from the target object based on the sensing signal configuration.

Aspect 35 is the method of any of aspects 24 to 34, where the sensing signal configuration may include a first indication of a first sensing resource associated with a first subset of the set of sensing signals and a second indication of a second sensing resource associated with a second subset of the set of sensing signals. The first reflected sensing signal may be associated with the first sensing resource. The second reflected sensing signal may be associated with the second sensing resource. Calculating the location of the target object may be further based on the first indication of the first sensing resource and the second indication of the second sensing resource.

Aspect 36 is the method of any of aspects 24 to 35, where the sensing signal configuration may include a first indication of a first time domain associated with a first subset of the set of sensing signals and a second indication of a second time domain associated with a second subset of the set of sensing signals. The first reflected sensing signal may be associated with the first time domain. The second reflected sensing signal may be associated with the second time domain. Calculating the location of the target object may be further based on the first indication of the first time domain and the second indication of the second time domain.

Aspect 37 is the method of any of aspects 24 to 36, where the sensing signal configuration may include a first indication of a first watermarking pattern associated with a first subset of the set of sensing signals and a second indication of a second watermarking pattern associated with a second subset of the set of sensing signals. The first reflected sensing signal may include the first watermarking pattern. The second reflected sensing signal may include the second watermarking pattern. Calculating the location of the target object may be further based on the first indication of the first watermarking pattern and the second indication of the second watermarking pattern.

Aspect 38 is an apparatus for wireless communication, including: a memory; and at least one processor coupled to the memory and, based at least in part on information stored in the memory, the at least one processor is configured to implement any of aspects 1 to 37.

Aspect 39 is the apparatus of aspect 38, further including at least one of an antenna or a transceiver coupled to the at least one processor.

Aspect 40 is an apparatus for wireless communication including means for implementing any of aspects 1 to 37.

Aspect 41 is a computer-readable medium (e.g., a non-transitory computer-readable medium) storing computer executable code, where the code when executed by a processor causes the processor to implement any of aspects 1 to 37.

What is claimed is:

1. An apparatus for wireless communication at a first wireless device, comprising:
   memory; and
   at least one processor coupled to the memory and, based at least in part on information stored in the memory, the at least one processor is configured to:
      output a sensing signal configuration for performing sensing using a first reflected sensing signal from the first wireless device via a target object and a second reflected sensing signal from a reflective object via the target object based on a set of sensing signals, wherein the sensing signal configuration comprises a first indication of a type of reflector associated with the reflective object and a second indication of a position associated with the reflective object; and transmit the set of sensing signals to the target object and the reflective object, wherein the reflective object reflects at least one of the set of sensing signals to the target object based on the sensing signal configuration.

2. The apparatus of claim 1, wherein the reflective object comprises at least one of a reconfigurable intelligent surface (RIS) or a virtual transmission reception point (VTRP), wherein the sensing signal configuration comprises an indication of at least one of a location or a coverage of the RIS or the VTRP.

3. The apparatus of claim 1, further comprising a transceiver coupled to the at least one processor, wherein the reflective object comprises a reconfigurable intelligent surface (RIS), wherein the at least one processor is further configured to:

transmit, via the transceiver, an indication of a scatter direction to the RIS, wherein the sensing signal configuration comprises the indication of the scatter direction.

4. The apparatus of claim 1, wherein the at least one processor is further configured to:

receive a sensing request to perform sensing within a designated range; and identify a set of reflective objects that have a line of sight (LOS) path to the designated range with respect to the first wireless device, wherein the set of reflective objects comprise the reflective object, wherein, to transmit the set of sensing signals to the reflective object, the at least one processor is configured to:

transmit the set of sensing signals to the reflective object based on identification of the set of reflective objects comprising the reflective object.

5. The apparatus of claim 4, wherein the designated range comprises at least one of a second position of the target object or an area of interest comprising the position of the target object.

6. The apparatus of claim 1, wherein, to output the sensing signal configuration, the at least one processor is configured to:

transmit the sensing signal configuration to a second wireless device, wherein the second wireless device is different from the reflective object.

7. The apparatus of claim 6, wherein the sensing signal configuration comprises an indication of a set of narrow transmit beams associated with the set of sensing signals.

8. The apparatus of claim 7, wherein each of the set of narrow transmit beams comprises a discrete resource or a discrete direction.

9. The apparatus of claim 6, wherein the first wireless device comprises at least one of a first user equipment (UE) or a first network node, wherein the second wireless device comprises at least one of a second UE or a second network node.

10. The apparatus of claim 1, wherein the sensing signal configuration comprises an indication of a path report.

11. The apparatus of claim 10, wherein the at least one processor is further configured to:

transmit a second indication of a setting associated with the path report to a second wireless device; and receive the path report from the second wireless device based on the setting.

12. The apparatus of claim 1, wherein, to transmit the set of sensing signals to the target object and the reflective object, the at least one processor is configured to:

simultaneously transmit the set of sensing signals to the target object and the reflective object.

13. The apparatus of claim 12, wherein, to simultaneously transmit the set of sensing signals to the target object and the reflective object, the at least one processor is configured to:

transmit a broad beam that spans a first direction towards the target object and a second direction towards the reflective object.

14. The apparatus of claim 12, wherein, to simultaneously transmit the set of sensing signals to the target object and the reflective object, the at least one processor is configured to:

transmit a first beam with a first sensing resource in a first direction towards the target object; and transmit a second beam with a second sensing resource in a second direction towards the reflective object, wherein the first sensing resource is different from the second sensing resource.

15. The apparatus of claim 12, wherein, to simultaneously transmit the set of sensing signals to the target object and the reflective object, the at least one processor is configured to:

transmit a first beam with a sensing resource in a first direction towards the target object; and transmit a second beam with the sensing resource in a second direction towards the reflective object.

16. The apparatus of claim 1, wherein, to transmit the set of sensing signals to the target object and the reflective object, the at least one processor is configured to:

transmit a first beam towards the target object during a first time domain; and transmit a second beam towards the reflective object during a second time domain.

17. The apparatus of claim 1, wherein, to transmit the set of sensing signals to the target object and the reflective object, the at least one processor is configured to:

transmit a first beam with a first watermarking pattern towards the target object; and transmit a second beam with a second watermarking pattern towards the reflective object.

18. The apparatus of claim 1, wherein the at least one processor is further configured to:

receive a first reflected sensing signal of the transmitted set of sensing signals from the first wireless device via the target object;

receive a second reflected sensing signal of the transmitted set of sensing signals from the reflective object via the target object; and calculate a location of the target object based on the first reflected sensing signal, the second reflected sensing signal, and the sensing signal configuration.

19. A method of wireless communication at a first wireless device, comprising:

outputting a sensing signal configuration for performing sensing using a first reflected sensing signal from the first wireless device via a target object and a second reflected sensing signal from a reflective object via the target object based on a set of sensing signals, wherein the sensing signal configuration comprises a first indication of a type of reflector associated with the reflective object and a second indication of a position associated with the reflective object; and transmitting the set of sensing signals to the target object and the reflective object, wherein the reflective object reflects at least one of the set of sensing signals to the target object based on the sensing signal configuration.

20. An apparatus for wireless communication at a first wireless device, comprising:

memory; and at least one processor coupled to the memory and, based at least in part on information stored in the memory, the at least one processor is configured to:

output a sensing signal configuration for performing sensing using a first reflected sensing signal from the first wireless device via a target object and a second reflected sensing signal from a reflective object via the target object based on a set of sensing signals comprising a first beam and a second beam;

transmit the first beam in a first direction towards the target object; and transmit the second beam in a second direction towards the reflective object, wherein the reflective object reflects the second beam to the target object based on the sensing signal configuration.

21. The apparatus of claim 20, wherein the first beam comprises a first sensing resource, wherein the second beam comprises a second sensing resource, wherein the first sensing resource is different from the second sensing resource.

22. The apparatus of claim 20, wherein the first beam comprises a sensing resource, wherein the second beam comprises the sensing resource.

23. The apparatus of claim 20, wherein the at least one processor is further configured to:

receive a sensing request to perform sensing within a designated range; and identify a set of reflective objects that have a line of sight (LOS) path to the designated range with respect to the first wireless device, wherein the set of reflective objects comprise the reflective object, wherein, to transmit the second beam in the second direction towards the reflective object, the at least one processor is configured to:

transmit the second beam in the second direction towards the reflective object based on identification of the set of reflective objects comprising the reflective object.

24. The apparatus of claim 23, wherein the designated range comprises at least one of a position of the target object or an area of interest comprising the position of the target object.

25. The apparatus of claim 20, further comprising a transceiver coupled to the at least one processor, wherein, to output the sensing signal configuration, the at least one processor is configured to:

transmit, via the transceiver, the sensing signal configuration to a second wireless device, wherein the second wireless device is different from the reflective object.

26. The apparatus of claim 25, wherein the sensing signal configuration comprises an indication of a set of narrow transmit beams associated with the set of sensing signals, wherein each of the set of narrow transmit beams comprises a discrete resource or a discrete direction.

27. The apparatus of claim 20, wherein the sensing signal configuration comprises an indication of a path report.

28. The apparatus of claim 27, wherein the at least one processor is further configured to:

transmit a second indication of a setting associated with the path report to a second wireless device; and receive the path report from the second wireless device based on the setting.

29. The apparatus of claim 20, wherein the at least one processor is further configured to:

receive a first reflected sensing signal of the transmitted set of sensing signals from the first wireless device via the target object;

receive a second reflected sensing signal of the transmitted set of sensing signals from the reflective object via the target object; and calculate a location of the target object based on the first reflected sensing signal, the second reflected sensing signal, and the sensing signal configuration.

30. A method for wireless communication at a first wireless device, comprising:

outputting a sensing signal configuration for performing sensing using a first reflected sensing signal from the first wireless device via a target object and a second reflected sensing signal from a reflective object via the target object based on a set of sensing signals comprising a first beam and a second beam;

transmitting the first beam in a first direction towards the target object; and transmitting the second beam in a second direction towards the reflective object, wherein the reflective object reflects the second beam to the target object based on the sensing signal configuration.

* * * * *